United States Patent
Ise et al.

(10) Patent No.: US 10,361,430 B2
(45) Date of Patent: *Jul. 23, 2019

(54) ACTIVE MATERIAL, NONAQUEOUS ELECTROLYTE BATTERY, BATTERY PACK, AND VEHICLE

(71) Applicant: KABUSHIKI KAISHA TOSHIBA, Minato-ku (JP)

(72) Inventors: Kazuki Ise, Kawasaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 169 days.

This patent is subject to a terminal disclaimer.

(21) Appl. No.: 15/261,540

(22) Filed: Sep. 9, 2016

(65) Prior Publication Data
US 2017/0077509 A1    Mar. 16, 2017

(30) Foreign Application Priority Data
Sep. 16, 2015 (JP) ................... 2015-182914

(51) Int. Cl.
*H01M 10/056* (2010.01)
*H01M 4/485* (2010.01)
(Continued)

(52) U.S. Cl.
CPC ........... *H01M 4/485* (2013.01); *H01M 4/625* (2013.01); *H01M 10/056* (2013.01);
(Continued)

(58) Field of Classification Search
CPC ............. H01M 4/485; H01M 10/0525; H01M 10/056; H01M 10/0562; H01M 10/0565;
(Continued)

(56) References Cited

U.S. PATENT DOCUMENTS

| 2005/0158550 A1* | 7/2005 | Ohta | ........ H01M 4/587 428/407 |
| 2006/0068287 A1* | 3/2006 | Morita | ........ H01M 4/134 429/223 |

(Continued)

FOREIGN PATENT DOCUMENTS

| JP | 2004-349217 A | 12/2004 |
| JP | 2008-235258 A | 10/2008 |

(Continued)

OTHER PUBLICATIONS

JP 2012-197187MT (Year: 2012).*

(Continued)

*Primary Examiner* — Alexander Usyatinsky
(74) *Attorney, Agent, or Firm* — Oblon, McClelland, Maier & Neustadt, L.L.P.

(57) ABSTRACT

According to one embodiment, an active material is provided. This active material includes active material particles each allowing lithium to be inserted thereinto and extracted therefrom in the range of 0.5 V to 2V (vs. Li$^+$/Li), and carbon material layers at least partially coating the active material particles. The active material has a BET specific surface area S of 2 m$^2$/g to 20 m$^2$/g in accordance with a nitrogen adsorption method. Between the BET specific surface area S and the proportion M (mass %) of the mass of the carbon material layers to the total mass of the active material particles and carbon material layers, the ratio of S/M (m$^2$/g) meets $0.5 \leq S/M \leq 5$.

15 Claims, 7 Drawing Sheets

(51) Int. Cl.
*H01M 4/62* (2006.01)
*H01M 10/0525* (2010.01)
*H01M 4/02* (2006.01)
*H01M 4/36* (2006.01)

(52) U.S. Cl.
CPC ........ *H01M 4/366* (2013.01); *H01M 10/0525* (2013.01); *H01M 2004/027* (2013.01); *H01M 2220/20* (2013.01); *Y02E 60/122* (2013.01)

(58) Field of Classification Search
CPC ......... H01M 10/0569; H01M 10/0585; H01M 10/0587; H01M 2/10; H01M 4/131; H01M 4/48; H01M 4/505; H01M 4/525; H01M 4/58; H01M 4/62; H01M 4/66; H01M 4/625; H01M 2004/027; H01M 2220/20; H01M 4/366; Y02E 60/122
See application file for complete search history.

(56) References Cited

U.S. PATENT DOCUMENTS

| | | | |
|---|---|---|---|
| 2007/0009797 A1* | 1/2007 | Takami | H01M 2/1077 429/231.1 |
| 2007/0248884 A1* | 10/2007 | Tsuchiya | H01M 4/133 429/231.4 |
| 2011/0165465 A1* | 7/2011 | Kim | H01M 4/362 429/231.5 |
| 2012/0052401 A1* | 3/2012 | Goodenough | C01G 33/00 429/341 |
| 2012/0129052 A1* | 5/2012 | Bauer | H01M 4/366 429/231.1 |
| 2015/0010820 A1* | 1/2015 | Takami | H01M 4/366 429/221 |
| 2015/0086872 A1 | 3/2015 | Ise et al. | |
| 2015/0243979 A1* | 8/2015 | Nakahara | C01G 33/00 429/231.1 |

FOREIGN PATENT DOCUMENTS

| | | |
|---|---|---|
| JP | 2012-197187 | * 10/2012 |
| JP | 2012-197187 A | 10/2012 |
| JP | 2012-527067 A | 11/2012 |
| JP | 2015-84321 A | 4/2015 |
| JP | 2015-088467 A | 5/2015 |
| WO | WO 03/063274 A1 | 7/2003 |

OTHER PUBLICATIONS

Jian-Tao Han, et al., "New Anode Framework for Rechargeable Lithium Batteries" Chemistry of Materials, vol. 23, No. 8, 2011, pp. 2027-2029 Retrieved on Jul. 11, 2016 at http://pubs.acs.org/doi/abs/10.1021/cm200441h.

* cited by examiner

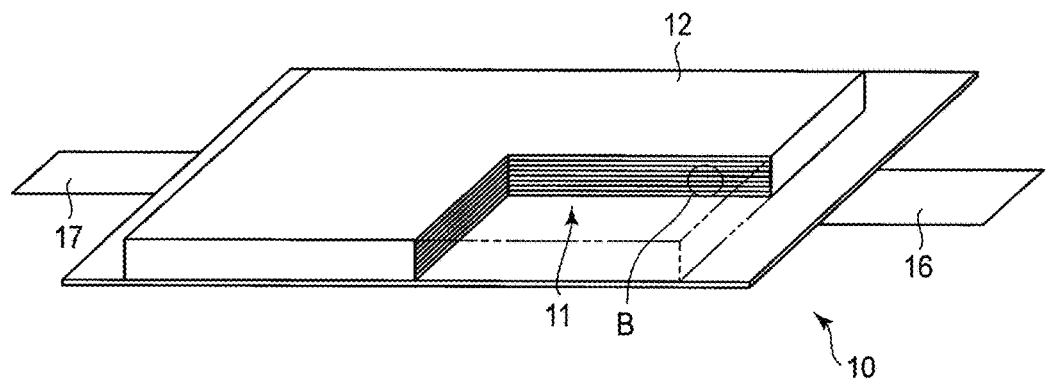
F I G. 3
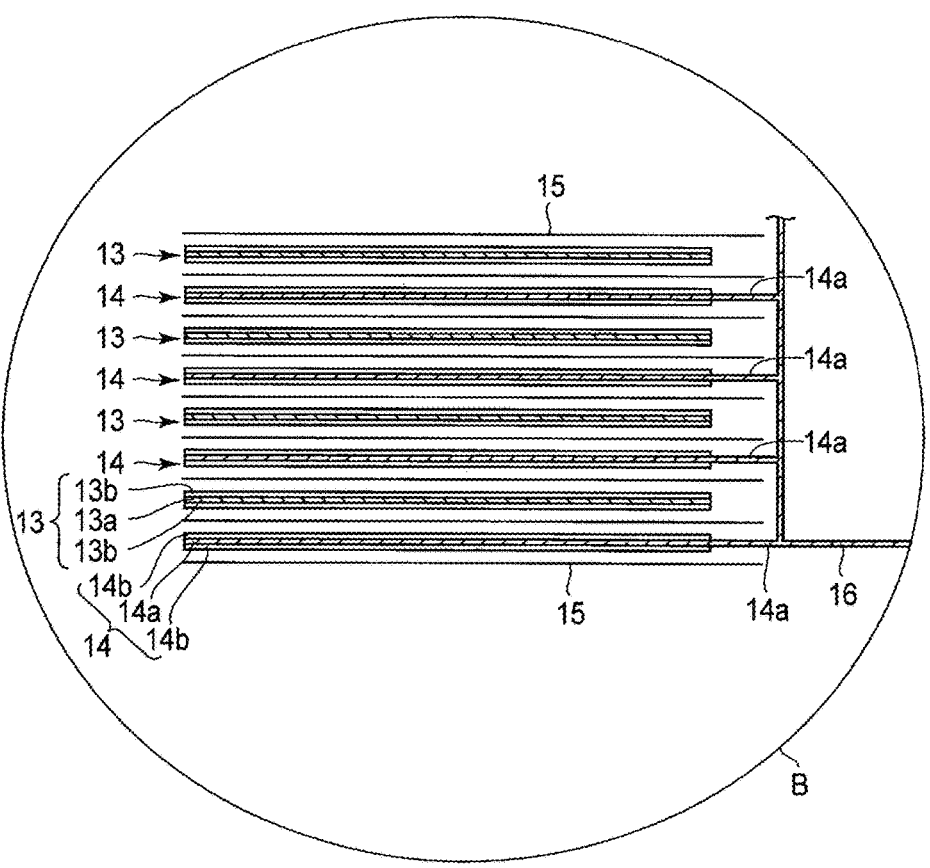
F I G. 4

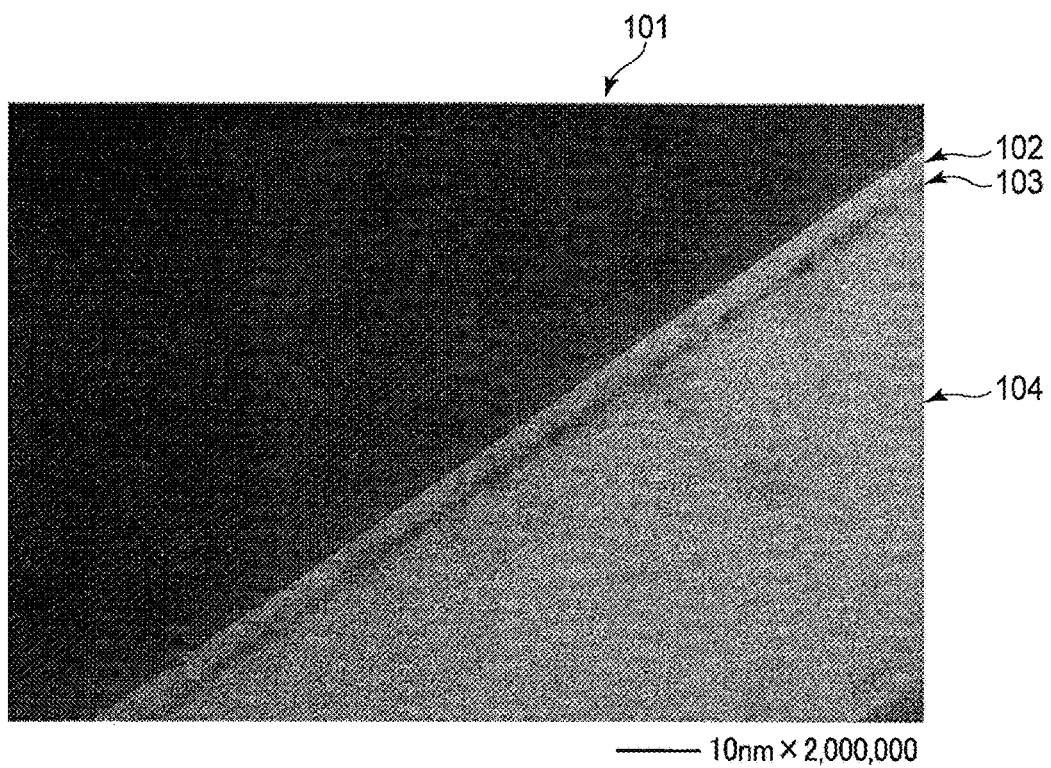
F I G. 7

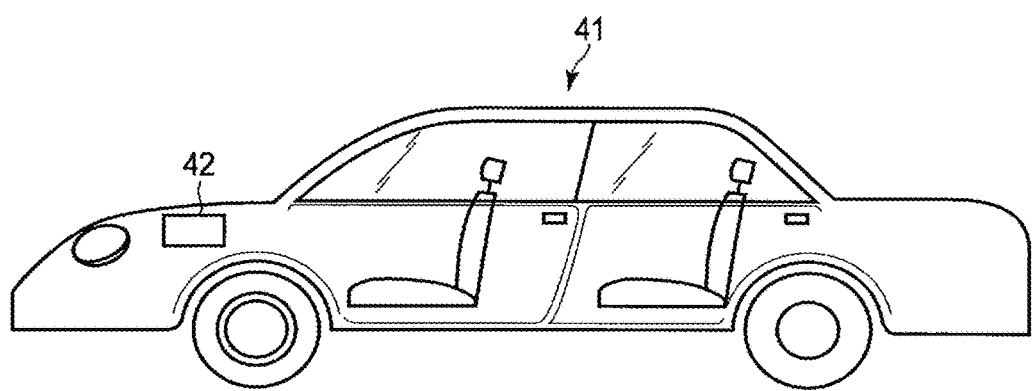
F I G. 10

US 10,361,430 B2

ACTIVE MATERIAL, NONAQUEOUS ELECTROLYTE BATTERY, BATTERY PACK, AND VEHICLE

CROSS-REFERENCE TO RELATED APPLICATIONS

This application is based upon and claims the benefit of priority from Japanese Patent Application No. 2015-182914, filed Sep. 16, 2015, the entire contents of which are incorporated herein by reference.

FIELD

Embodiments described herein relate generally to an active material for a battery, a nonaqueous electrolyte battery, a battery pack, and vehicle.

BACKGROUND

In recent years, nonaqueous electrolyte batteries such as lithium ion secondary batteries have been developed as high-energy density batteries. Nonaqueous electrolyte batteries are expected as power sources for vehicles such as hybrid automobiles and electric automobiles, and as large-size power sources for electric storage. In particular, for the application for vehicles, nonaqueous electrolyte batteries are required to have other characteristics such as rapid charge-discharge performance and long-term reliability. Nonaqueous electrolyte batteries capable of rapid charge and discharge have the advantage of a very short charging time, and can improve vehicle performance in hybrid automobiles and further efficiently recover regenerative energy for use as power.

The rapid charge and discharge are made possible by rapid movements of electrons and lithium ions between positive electrodes and negative electrodes. However, in batteries that use carbon-based negative electrodes including carbonaceous materials, repeated rapid charge and discharge may deposit dendrites of metal lithium on the electrodes. These dendrites can cause internal short-circuits, thereby resulting in heat generation and ignition.

Therefore, batteries have been developed which use, as negative electrode active materials, metal composite oxides in place of the carbonaceous materials. In particular, batteries that use titanium oxides as negative electrode active materials are capable of stable rapid charge and discharge, and also have longer lifetimes as compared with carbon-based negative electrodes.

However, such titanium oxides have higher (nobler) potentials with respect to metal lithium as compared with carbonaceous materials. Moreover, the titanium oxides are low in capacity per mass. For this reason, batteries using these titanium oxides have the problem of being low in energy density.

For example, the electrode potential of titanium oxide is approximately 1.5 V on the basis of metal lithium, and higher (nobler) as compared with the potentials of carbon-based negative electrodes. The potential of the titanium oxide is derived from a redox reaction between $Ti^{3+}$ and $Ti^{4+}$ in the electrochemical insertion and extraction of lithium, and thus electrochemically restricted. In addition, rapid lithium ion charging and discharging can be achieved in a stable manner at a high electrode potential on the order of 1.5 V. Therefore, it is substantially difficult to lower the electrode potential in order to improve the energy density.

On the other hand, as for the capacity per unit mass, lithium-titanium composite oxides such as $Li_4Ti_5O_{12}$ have a theoretical capacity of around 175 mAh/g. On the other hand, common carbon-based electrode materials have a theoretical capacity of 372 mAh/g. Accordingly, titanium oxides are significantly lower in capacity density as compared with carbon-based negative electrodes. This is because the crystal structures of the titanium oxides have therein small numbers of sites in which lithium can be inserted, or lithium is easily stabilized in the structures, thus decreasing the substantial capacity.

In view of the foregoing, novel materials have been developed. For example, titanium-based oxides that have a monoclinic beta structure and lithium-titanium based oxides have been attracting attention, because of their high theoretical capacity of 335 mAh/g. Furthermore, new electrode materials containing Ti and Nb have been studied, and in particular, monoclinic Nb—Ti based composite oxides represented by $TiNb_2O_7$ perform charge compensation of Ti from tetravalence to trivalence and Nb from pentavalence to trivalence during lithium insertion, thus leading to a high theoretical capacity of 387 mAh/g.

However, these negative electrode active materials cause strong reactions at potentials that are lower than 1.3 V (vs. $Li^+/Li$). In particular, in batteries including nonaqueous electrolytic solutions including fluorine-containing supporting salts such as $LiPF_6$ or $LiBF_4$, decomposition reactions of the nonaqueous electrolytic solutions proceed with extraction of lithium ions included in the active materials, thereby generating inorganic films such as LiF and $Li_2CO_3$. These inorganic films interfere with the insertion and extraction of lithium ions to and from the active material, and thus act as resistance. As a result, there is the problem of degraded cycle characteristics.

BRIEF DESCRIPTION OF THE DRAWINGS

FIG. 3 shows a partially cutaway perspective view schematically illustrating another example of the nonaqueous electrolyte battery according to the second embodiment;

FIG. 4 shows an enlarged cross-sectional view of a B part in FIG. 3;

FIG. 7 shows a photograph showing an example of a transmission electron microscope (Transmission Electron Microscope; TEM) image of an active material for batteries according to Example 1;

FIG. 10 shows an example of a vehicle according to a fourth embodiment.

DETAILED DESCRIPTION

Figure 1:
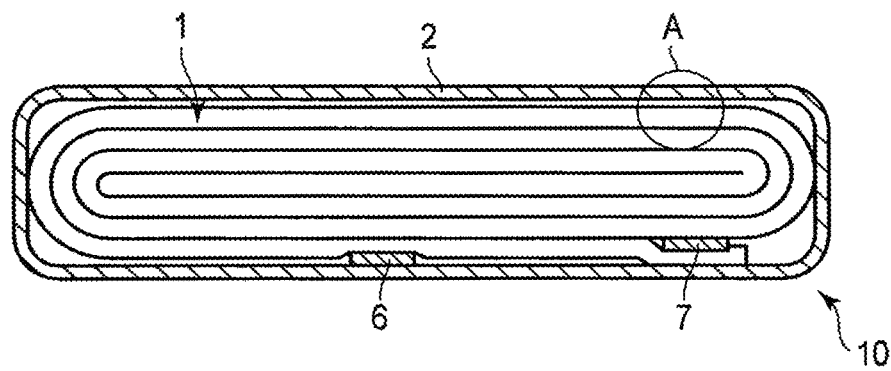
FIG. 1 shows a cross-sectional view illustrating an example of a nonaqueous electrolyte battery according to a second embodiment.

According to a first embodiment, an active material is provided. This active material includes active material particles each allowing lithium to be inserted thereinto and extracted therefrom in the range of 0.5 V to 2V (vs. Li+/Li), and carbon material layers at least partially coating the active material particles. The active material has a BET specific surface area S of 2 m²/g to 20 m²/g in accordance with a nitrogen adsorption method. Between the BET specific surface area S and the proportion M (mass %) of the mass of the carbon material layers to the total mass of the active material particles and carbon material layers, the ratio of S/M (m²/g) meets 0.5≤S/M≤5.

According to a second embodiment, a nonaqueous electrolyte battery is provided. The nonaqueous electrolyte battery includes a positive electrode, a negative electrode including the active material according to the first embodiment, and a nonaqueous electrolyte.

According to a third embodiment, a battery pack is provided. This battery pack includes the nonaqueous electrolyte battery according to the second embodiment.

According to a fourth embodiment, a vehicle is provided. This vehicle includes the battery pack according to the third embodiment.

Embodiments are explained below referring to drawings. In the following descriptions, the same reference number is applied to structural features having the same or similar function throughout all drawings, and overlapped explanations are omitted. Each drawing is a schematic view for explaining the embodiment and promoting the understanding thereof. Shapes, sizes and ratios in the drawing, accordingly, may be different from those in a practical apparatus, but they may be appropriately designed and changed considering the following descriptions and known technology.

(First Embodiment)

According to the present embodiment, an active material for the batteries is provided. This active material includes active material particles each allowing lithium to be inserted thereinto and extracted therefrom in the range of 0.5 V to 2V (vs. Li+/Li), and carbon material layers at least partially coating the active material particles. The active material has a BET specific surface area S of 2 m2/g to 20 m2/g in accordance with a nitrogen adsorption method. Between the BET specific surface area S and the proportion M (mass %) of the mass of the carbon material layer to the total mass of the active material particles and carbon material layers, the ratio of S/M (m2/g) meets 0.5≤S/M≤5.

The negative electrode active material where the insertion and extraction of lithium proceed by solid solution reaction within the range of 0.5 V to 2 V (vs. Li+/Li) has an insulating performance when lithium is not inserted but has increased electron conductivity with increased insertion of lithium. When the active material particles are not coated with the carbon material layer, a decomposition reaction of the electrolyte is increased at the interface of the active material with high lithium ion conductivity and electron conductivity. As a result, for example in the case of including an electrolyte using a LiPF$_6$ supporting salt, inorganic films are produced such as a lithium fluoride and a lithium carbonate. These inorganic films interfere with the insertion and extraction of lithium ions to and from the active material, and thus act as resistance. As a result, there has been the problem of degraded cycle characteristics.

The inventors have, as a result of earnestly carrying out studies in light of the finding mentioned above, found an active material for batteries, which includes active material particles each allowing lithium to be inserted thereinto and extracted therefrom in the range of 0.5 V to 2 V (vs. Li+/Li); and a carbon material layers at least partially coating the active material particles, where the BET specific surface area S in a nitrogen adsorption method is 2 m²/g to 20 m²/g, and the ratio of S/M (m²/g) is 0.5≤S/M≤5 between the BET specific surface area S and the proportion M (mass %) of the mass of the carbon material layer to the total mass of the active material particles and the carbon material layers, thus making it possible to inhibit the decomposition reaction of an electrolyte even in a highly charging condition, because the carbon material layer at least partially coats the surfaces of the active material particles. As a result, the high electron conductivity of the active material particles is protected by the carbon material layers.

This active material for batteries has a specific surface area in the range mentioned above, and the ratio S/M in the range mentioned above. Therefore, the carbon material layer coating the surfaces of the active material particles has high smoothness. In addition, the carbon material layer is provided to have an appropriate mass (thickness), and the insertion and extraction of lithium are thus unlikely to be blocked. Further, the electron conductivity of the carbon material layer is lower as compared with the electron conductivity of the active material particles themselves. Due to the foregoing, side reactions are inhibited between the nonaqueous electrolyte and lithium ions.

As just described, the carbon material layer protects the high electron conductivity of the active material particles, and inhibits the side reactions, thereby improving cycle characteristics of the nonaqueous electrolyte batteries.

In accordance with the nonaqueous electrolyte battery including the active material for batteries, cycle characteristics are also improved in a battery that includes a nonaqueous electrolyte including a supporting salt containing fluorine, such as LiPF$_6$ or LiBF$_4$.

The reason of using, as the active material particles, particles with a lithium insertion potential within the range mentioned above will be described. In the case of using active material particles that insert lithium ions at a potential less than 0.5 V, the repeated input and output with a large current cause metal lithium to deposit on the electrode surface, and grow in the form of dendrites. Therefore, repeated input and output with a large current makes an internal short-circuit likely to be caused. On the other hand, the use of active material particles that insert lithium ions at a potential of 0.5 V or more can inhibit the deposition of metal lithium on the electrode surface, thus allowing an internal short-circuit to be avoided. In addition, the use of active material particles into and from which lithium is inserted and extracted at a potential in excess of 2V has the possibility of failing to achieve a high battery voltage.

For this reason, the lithium insertion potential of the active material particles falls, for example, within 0.5 V to 2 V (vs. Li+/Li), preferably within the range of 1 V to 1.6 V (vs. Li+/Li).

Examples of the active material particles with a lithium insertion potential of 0.5 V to 2 V (vs. Li+/Li) include metal oxides, metal fluorides, metal nitrides, and alloys.

The metal oxides for use in the active material particles include, for example, titanium-containing metal composite oxides, tin-based oxides such as SnB$_{0.4}$P$_{0.6}$O$_{3.1}$ or SnSiO$_3$, silicon-based oxides such as SiO, and tungsten-based oxides such as WO$_3$. Among these oxides, the titanium-containing metal composite oxides are preferred.

The titanium-containing metal composite oxides include, for example, niobium-titanium composite oxides, titanium-based oxides containing no lithium during the synthesis of the oxides, composite oxides represented by the general formula Li$_x$M1$_{1-y}$M2$_y$Ti$_{6-z}$M3$_z$O$_{14+\delta}$ (in the formula, M1 represents at least one selected from the group consisting of Sr, Ba, Ca, and Mg, M2 represents at least one selected from the group consisting of Cs, K, and Na, M3 represents at least one selected from the group consisting of Al, Fe, Zr, Sn, V, Nb, Ta, and Mo, x falls within the range of 2≤x≤6, y falls within the range of 0<y<1, z falls within the range of 0≤z≤6, and δ falls within the range of −0.5≤δ≤0.5), lithium-titanium oxides, lithium-titanium composite oxides with constituent elements partially substituted with dopants, and sodium-niobium-titanium oxides. The lithium-titanium oxides include, for example, a lithium titanate that has a spinel structure (e.g., $Li_{4+x}Ti_5O_{12}$ (x is a value that is changed by charge and discharge, 0≤x≤3)), and ramsdellite-type lithium titanate (e.g., $Li_{2+y}Ti_3O_7$ (y is a value that is changed by charge and discharge, 0≤y≤3)).

The titanium-based oxides include metal composite oxides containing $TiO_2$ or Ti, and at least one element selected from the group consisting of V, Sn, Cu, Ni, Co, and Fe. One sort of the element may be used alone and two or more sort of the elements may be used in combination. In particular, among titanium composite oxides that have a monoclinic beta structure as a type of $TiO_2$, titanium oxides that have a monoclinic beta structure are represented by $TiO_2$ (B). The titanium composite oxides that have a monoclinic beta structure include $TiO_2$ (B) and where the constituent elements of $TiO_2$ (B) are partially substituted with a dopant (for example, lithium).

The metal composite oxides containing Ti and at least one element selected from the group consisting of V, Sn, Cu, Ni, Co, and Fe include, for example, $TiO_2$—$V_2O_5$, $TiO_2$—$P_2O_5$—$SnO_2$, $TiO_2$—$P_2O_5$-MeO (Me is at least one element selected from the group consisting of Cu, Ni, Co, and Fe). The metal composite oxides preferably have a microstructure with the coexistence of a crystal phase and an amorphous phase, or the existence of an amorphous phase alone. This microstructure can improve cycle characteristics.

The metal sulfides include, for example, titanium based sulfides such as $TiS_2$, molybdenum-based sulfides such as $MoS_2$, and iron-based sulfides such as FeS, $FeS_2$, and $Li_xFeS_2$ (0≤x≤4).

The metal nitrides include, for example, lithium-based nitrides (e.g., $(Li,Me)_3N$ {Me is a transition metal element}).

The active material particles used can include one type of particle, or two or more types of particles.

The active material particles have a form including secondary particles of primary particles agglomerated. The active material for batteries according to the present embodiment can increase the density while maintain the agglomerated form of secondary particles in the active material. As a result, both conduction in the secondary particles and conduction between the secondary particles can be made favorable. As long as the secondary particles are included, there may be primary particles as they are. More specifically, the active material particles can include isolated primary particles and secondary particles of primary particles agglomerated. The active material particles including the secondary particles and the isolated primary particles desirably have an average particle size of 0.1 μm to 10 μm for the primary particles, and an average particle size of 1 μm to 30 μm for the secondary particles. The average particle size for the primary particles and the average particle size for the secondary particles within the ranges mentioned previously can suppress degradation of the active material by reaction with the nonaqueous electrolyte. A more preferred range of the average particle size for the primary particles is 0.5 μm to 3 μm, whereas a more preferred range of the average particle size for the second particles is 10 μm to 20 μm.

The form of the carbon material layers coating the active material particles is not particularly limited, but the carbon material layers may coat the whole active material particles, or partially coat the surfaces of the active material particles. However, with the active material particles in direct contact with the nonaqueous electrolyte, it is difficult to reduce a side reaction at the interface therebetween. In addition, in this case, the electron conductivity of the active material particles is unlikely to be protected. Therefore, the entire surfaces of the active material particles are preferably coated with the carbon material layers.

The film thickness of the carbon material layer falls, for example, within the range of 0.5 nm to 15 nm, preferably within the range of 0.5 nm to 10 nm.

Analysis of the carbon material layer by Raman spectrometry with use of a measurement light source of 532 nm can determine the crystallinity of the carbon material. In this Raman chart, a G band observed around 1580 $cm^{-1}$ corresponds to a peak derived from a graphite structure, and a D band observed around 1330 $cm^{-1}$ corresponds to a peak derived from a carbon defect structure. It is to be noted that the G band and the D band can be shifted on the order of ±50 $cm^{-1}$ respectively from 1580 $cm^{-1}$ and 1330 $cm^{-1}$ under the influence of the optical system and the like. The method of Raman spectrometry will be described later.

The crystallinity of the carbon material can be determined on the basis of the ratio $I_G/I_D$ between the peak intensity $I_G$ of the G band and the peak intensity $I_D$ of the D band and the full widths at half maximum for the G band and the D band in the Raman chart. For example, the amorphous property of the carbon material is increased as the ratio of $I_G/I_D$ becomes smaller. In addition, for example, as the full width at half maximum for the G band or the D band has larger, the amorphous property of the carbon material is increased. The method for calculating the full widths at half maximum for the peaks will be described later.

The carbon material layer coating the active material particles is preferably highly amorphous. The proportion of the mass of amorphous carbon to the mass of the entire carbon material layer is desirably 2% or more.

When the carbon material layer is highly amorphous, the carbon material layer is low in conductivity as compared with a case of high crystallinity, and lithium ions are thus unlikely to be eluted into the nonaqueous electrolyte. More specifically, when the carbon material layer is highly amorphous, the decomposition reaction of the electrolyte with extraction of lithium ions can be further inhibited. Thus, cycle characteristics are improved.

The ratio of $I_G/I_D$ falls, for example, within the range of 0.8 to 1.2, preferably within the range of 0.9 to 1.2. In addition, the full width at half maximum for the G band is, for example, 70 $cm^{-1}$ or more. The full width at half maximum for the D band is, for example, 170 $cm^{-1}$ or more.

When the ratio of $I_G/I_D$ is excessively high, there is a high level of carbon component derived from the graphite structure. In this case, impurities included in the carbon source may be included. Such impurities cause the side reaction with the nonaqueous electrolyte to proceed, and thus has the possibility of adversely affecting the cycle characteristics of the nonaqueous electrolyte battery.

The BET specific surface area S ($m^2/g$) of the active material of the active material particles coated with the carbon material layer in accordance with a nitrogen adsorption method falls, for example, within the range of 2 $m^2/g$ to 20 $m^2/g$, preferably within the range of 2 $m^2/g$ to 10 $m^2/g$, and more preferably within the range of 2 $m^2/g$ or more and less than 5 $m^2/g$. When the BET specific surface area S falls within this range, the side reaction can be inhibited because the surface is coated uniformly with the carbon material layer.

When the proportion of the mass of the carbon material layer to the total mass of the active material particles and carbon material layer is denoted by M (mass %), M falls, for example, within the range of 2 to 10 mass, preferably within the range of 2 to 5 mass.

Between the BET specific surface area S and the proportion M of the mass of the carbon material layer to the total mass of the active material particles and carbon material layer, the ratio of S/M ($m^2/g$) preferably meets $0.5 \leq S/M \leq 5$, and more preferably $0.5 \leq S/M \leq 2$. The ratio of S/M in the range of 0.5 to 5 can prevent a lithium diffusion performance from being excessively degraded by an increase in interface resistance, and allows efficient conductivity to be ensured. When the ratio of S/M is less than 0.5, there is a possibility that the battery capacity will be lowered because of the large mass of the carbon material layer with respect to the whole active material. A ratio of S/M in excess of 5 has, because of the small mass of the carbon material layer, the possibility of failing to inhibit the side reaction sufficiently, resulting in unfavorable cycle characteristics.

The median diameter (d50) of the active material of the active material particles coated with the carbon material falls, for example, within the range of 2 μm to 20 μm, preferably within the range of 2 μm to 10 μm.

The active material for batteries according to the first embodiment can be manufactured by, for example, a method for manufacturing an active material for batteries as will be described later.

Next, Raman spectrometry, particle size distribution measurement, specific surface area measurement, a method for specifying the presence or absence of a carbon material layer, and a method for evaluating the mass of the carbon material layer will be described according to the present embodiment.

<Raman Spectrometry>

As an approach for quantitative evaluation of the crystallinity of the carbon component included in the active material, a microscopic Raman measurement device can be used. For example, Thermo Fisher Scientific ALMEGA can be used as the microscopic Raman device. The measurement conditions can be, for example, the wavelength from a measurement light source: 532 nm; slit size: 25 μm; laser intensity: 10%; exposure time: 5 s, and cumulative number: 10 times.

The Raman spectrometry can be performed, for example, in accordance with the procedure described below.

While the active material is able to be evaluated directly as long as the material is powdery, a battery has lithium ions extracted therefrom completely in the case of evaluating the active material for batteries, incorporated in in the battery. When the active material is used as, for example, a negative electrode active material, the battery is completely discharged. However, even in the discharged state, residual lithium ions can be present.

Next, in a glove box filled with argon, the battery is broken down, and the electrodes are cleaned with an appropriate solvent. In this regard, for example, ethyl methyl carbonate or the like may be used. Next, the active material is peeled from the cleaned electrodes to collect a sample.

With the use of the collected sample, Raman spectrometry is performed under, for example, the conditions described previously.

For the measurement, whether Raman activity is shown or not, and peak positions are figured out for the current collector, and the other components included in the combination, such as the conductive agent and the binder. If there is any overlap, there is a need to separate the peak for the component other than the active material.

When the active material is mixed with a conductive agent in the electrode, it can be difficult to distinguish between the carbon material included in the active material and the carbon material incorporated as a conductive agent in the electrode. In this case, as a method for distinguishing between the materials, for example, a method is conceivable where the binder is dissolved and removed with a solvent, and centrifugation is then carried out to extract the active material which is higher in specific gravity. The active material and the conductive agent can be separated according to such method, and the carbon material included in the active material can be thus subjected to measurement while the carbon material is kept included in the active material.

Alternatively, an approach can be also adopted, where in accordance with mapping by Raman spectroscopy, a component for the conductive agent and a component for the active material are separated by carrying out mapping from a spectrum component derived from the active material, and thereafter, only the Raman spectrum corresponding to the component for the active material is extracted and evaluated.

The full widths at half maximum for the peaks are calculated by, for example, the following method.

First, when the background intensity is significant, the background is considered to be able to be approximated by a line, and subtracted between the measurement points of 1000 $cm^{-1}$ and 2000 $cm^{-1}$. Next, the high peak observed around 1580 $cm^{-1}$ and the high peak observed around 1330 $cm^{-1}$ are assumed to be related respectively to the G band and the D band, peaks are further assumed to be observed around 1250 $cm^{-1}$ and around 1500 $cm^{-1}$, and fitting is carried out on the basis of the four peaks in total. The Lorenz/Gauss function is used for the fitting function.

However, there is also considered the possibility of including a peak for the active material and peaks for the others included in the electrode within the measurement range from 1000 $cm^{-1}$ to 2000 $cm^{-1}$. In such a case, the fitting range is preferably further limited.

<Measurement of Particle Size Distribution>

The average particle size for the active material particles can be obtained from, for example, a particle size distribution (a distribution on the basis of weight). The particle size distribution for the active material particles can be obtained by, for example, measurement with a laser diffractometer or the like in the case of a powder. For example, the particle size distribution is measured with a laser diffractometer to calculate the weight distribution (weight %). In this case, agglomeration is favorably prevented while vibrating with ultrasonic waves. The measurement conditions are adjusted to conditions recommended for each material by the maker of the laser diffractometer. In this regard, when the target material is an electrode body, the electrode cut appropriately is immersed in a solvent (preferably an organic solvent such as alcohols and N-methylpyrrolidone), and subjected to ultraviolet waves in order to extract the active material. Thus, the electrode material layer can be peeled from the current collecting foil. Next, the peeled electrode material layer is put in a dispersing solvent, and the dispersion liquid is subjected to centrifugation in a centrifuge. Thus, solely the active material can be separated from the powder of the electrode material layer including the conductive agent such as carbon. Alternatively, if there is any material (e.g., carbon, current collector, binder) other than the electrode material layer, a powder with the material removed therefrom is favorably prepared in advance, and subjected to preliminary measurement, and excluded from the measurement result.

<Measurement of BET Specific Surface Area>

The BET specific surface area refers to a specific surface area specified by a BET method, which is calculated by a nitrogen adsorption method. The analysis is performed by, for example, the following method. The mass of the active material is adjusted to 4 g. As a cell for evaluation, for example, a cell of ½ inches is used. As a pretreatment method, the cell for evaluation is subjected to drying under reduced pressure for 15 hours at a temperature of approximately 100° C. or higher, thereby carrying out a degassing treatment. For example, TriStar II 3020 from Shimdzu-Micromeritics is used as the measurement system. While changing the pressure, a nitrogen gas is adsorbed, thereby providing an adsorption isotherm where the horizontal axis indicates a relative pressure, whereas the vertical axis indicates the amount of $N_2$ gas adsorption. While this curve is presumed to be based on the BET theory, the formula of BET can be applied to calculate the specific surface area.

<Method for Specifying Presence or Absence of Carbon Material Layer>

The carbon material of the active material according to the present invention can be identified by a method such as, for example, transmission electron microscope (TEM) observation.

In the case of TEM observation of a powder, the powder is embedded in a resin, then made into a thin film, and observed in accordance with a typical method, but it may be difficult to distinguish between the carbon material layer and resin of the surface layer in this case. Therefore, the active material is preferably first coated with a heavy element in advance. The heavy element serves to act as contrast as darkness in the TEM image, and the carbon material layer and the resin can be thus distinguished. For example, a Ru element is used as the heavy element. Next, the electrode is wrapped in an epoxy-based resin. Thereafter, the immobilized sample is mechanically polished, and then made into a thin film by ion milling. For example, DualMill 600 from GATAN is used as a system for the ion milling.

For example, H-9000UHR III from Hitachi, Ltd. is used as an analyzer for the TEM observation. The observation conditions are, for example, acceleration voltage: 300 kV, and image magnification: 400000-fold magnification.

In order to identify the structure of the active material particle as a base material, a particle with the appearance of a lattice image is first found from the image obtained. Then, the lattice image of the particle is subjected to Fourier transform, thereby providing a reciprocal lattice image. In order to identify the structure of the active material particle, an FFT analysis is preferably further conducted on the basis of the lattice image obtained. This Fast Fourier Transform (FFT) analysis is conducted as follows, for example. A negative film exposed at a 400000-fold image magnification is digitized (4000 dpi) through a negative scanner, and enlarged 5 times (800 dpi) with image processing software in a PC. Next, using the image processing software, a point with a lattice fringe obtained is cut out on the order of 500 pxφ. Next, a FFT pattern is acquired by Fourier transform with image analysis software. It is possible to use, for example, CryStMapp from NEC for the image analysis software.

<Method for Evaluating Weight of Coating Carbon>

The content of the carbon material contained in the active material is calculated by, for example, a high-frequency heating-infrared absorption method. In accordance with the high-frequency heating-infrared absorption method, the concentration of the active material per unit weight can be calculated by checking the amount of burned carbon with an infrared detector. The sample and a crucible for measurement are subjected to drying under reduced pressure over 15 hours or more at a temperature of approximately 200° C. or higher, thereby carrying out a degassing treatment. For example, EMIA-920V2 from HORIBA is used as the analyzer. The weight of the active material for use in the evaluation is 1 g or more.

According to the first embodiment, the active material includes active material particles each allowing lithium to be inserted thereinto and extracted therefrom in the range of 0.5 V to 2V (vs. $Li^+/Li$), and carbon material layers coating at least some of the active material particles. The active material has a BET specific surface area S of 2 $m^2/g$ to 20 $m^2/g$, and between the BET specific surface area S and the proportion M (mass %) of the mass of the carbon material layer to the total mass of the active material particles and carbon material layers, the ratio of S/M meets $0.5 \leq S/M \leq 5$.

Accordingly, the active material for batteries according to the first embodiment can protect the electron conductivity of the active material particles even in a highly charged state, because the carbon material layers at least partially coats the surfaces of the active material particles. In addition, the surfaces of the carbon material layers coating the surfaces of the active material particles is highly smooth, the carbon material layers is provided to have an appropriate mass (thickness), and the insertion or extraction of lithium is thus not blocked. In addition, the electron conductivity of the carbon material layers is lower as compared with the electron conductivity of the active material particles themselves. Due to the foregoing, the side reaction can be reduced between the nonaqueous electrolyte and lithium ions. Therefore, the nonaqueous electrolyte battery including the active material can achieve excellent cycle characteristics.

The active material for batteries according to the present embodiment can be manufactured by a method including: preparing active material particles; dispersing the active material particles in a solution containing a carbon-containing compound, thereby preparing a dispersion liquid, and providing a composite including the active material particles and a phase including the carbon-containing compound; adjusting the pH of the dispersion liquid in the range of 9 to 12; and firing the composite at a temperature in the range of 650° C. to 900° C. under an inert gas atmosphere. The active material particles each allow lithium to be inserted thereinto and extracted therefrom in the range of 0.5 V to 2 V (vs. $Li^+/Li$).

The composite including the active material particles and the phase including the carbon-containing compound is subjected to firing at a temperature in the range of 650° C. to 900° C. under an inert atmosphere. Firing the composite at a temperature in this range can convert the phase including the carbon-containing compound to a highly amorphous carbon material layer.

In addition, firing the composite in the temperature range mentioned above can remove other components such as hydrogen, which can be included in the phase including the carbon-containing compound. The active material with impurities reduced or with no impurities contributes to inhibiting progress of the side reaction with the nonaqueous electrolyte, when the active material is used in a nonaqueous electrolyte battery. The firing temperature for the composite is preferably 700° C. to 800° C.

Adjusting the pH of the dispersion liquid with the composite dispersed within the range of 9 to 12 makes it possible to increase the zeta potential of the active material particles in the negative direction. Thus, the coating performance of the phase including the carbon-containing compound can be enhanced.

As a result, the method for manufacturing an active material for batteries according to the present embodiment can provide an active material for batteries, which can achieve a nonaqueous electrolyte battery with excellent cycle characteristics.

Firing the composite at a temperature of lower than 650° C. makes it difficult to make the carbon-containing compound sufficiently carbonized. In this case, the substituents included originally in the carbon-containing compound are likely to remain without being carbonized. Therefore, there is a possibility that the substituents will develop a side reaction with the nonaqueous electrolyte. Accordingly, a nonaqueous electrolyte battery including an active material manufactured through the firing at lower than 650° C. exhibits poor rate characteristics and cycle life.

The composite including the active material particles and the phase including the carbon-containing compound is formed by, for example, dispersing the active material particles in a solution including the carbon-containing compound, thereby preparing a dispersion liquid, and adjusting the pH of the dispersion liquid within the range of 9 to 12. Adjustment of the pH within this range makes it easy to cause the BET specific surface area S of the active material to fall within the range described in the first embodiment.

It is to be noted that the pH of the dispersion liquid including the carbon-containing compound and the active material particles may be changed appropriately in consideration of the isoelectric point of the active material particles used. This pH is not limited to pH 9 to 12 mentioned above, but can be changed appropriately, for example, within the range of 4 to 14.

The solvent of the solution including the carbon-containing compound is, for example, water. The pH of the dispersion liquid including the carbon-containing compound and the active material particles can be controlled with, for example, an ammonia aqueous solution.

The mass ratio between the active material and carbon-containing compound in the dispersion liquid falls, for example, within the range of 0.5 to 10 mass %, preferably within the range of 0.5 to 8 mass %.

A dispersion liquid with the pH adjusted is subjected to, for example, spray drying. The method for forming the phase including the carbon-containing compound on the surfaces of the active material particles is not limited to spray drying, and other methods can also be selected, such as the tumbling granulation method. The spray drying is preferred because of being able to inhibit agglomeration of particles, and rapidly evaporate the dispersing solvent, thereby increasing the coating uniformity.

After the composite is subjected to spray drying, the powder of the active material may be dried over 12 hours at 100° C., for example. Next, this powder is subjected to firing under an inert gas atmosphere. This firing is carried out at a temperature within the range of 650° C. to 900° C. This firing is carried out, for example, over 0.5 hours to 5 hours.

The inert gas for use in the firing is preferably at least one selected from the group consisting of nitrogen and carbon dioxide, in terms of cost in mass production.

The carbon-containing compound is preferably an organic compound having no cyclic structure of carbon skeleton. Such organic compounds can include, for example, polyvinyl alcohol (PVA) and carboxymethyl cellulose. These organic compounds have a chain-like structure without a cyclic structure of a carbon skeleton, and a graphite structure is thus unlikely to be formed in carbonization by firing under a reducing atmosphere. Therefore, these organic compounds are likely to be converted to highly amorphous carbon materials, when the compounds are subjected to firing under a reducing atmosphere. A particularly preferred carbon-containing compound is PVA.

PVA with a degree of saponification from 98 to 80% is preferably used as the PVA. The use of PVA with a degree of saponification lower than 80% increases the solubility in water, thereby slowing the deposition onto the particle surfaces when the dispersing solution is dried, and the particles thus tend to be aggregated. For this reason, the degree of saponification is preferably higher. However, PVA with a degree of saponification higher than 98% has significantly low solubility in water. Therefore, manufacturing becomes difficult, which is not preferred.

The active material subjected to spray drying has a higher proportion of primary particles agglomerated in the form of coarse secondary particles, as compared with the single primary particles. The active material excessively present in the form of secondary particles has the possibility of causing problems in manufacturing, such as broken foil, when a slurry is prepared and applied onto a current collecting foil for electrode preparation.

Therefore, in order to prevent such problems, the obtained active material may be subjected to grinding with the use of a mortar, a ball mill, a bead mill, a hammer mill, or the like. This grinding can increase the proportion of the active material present in the form of single primary particles. As a result, the dispersion performance of the active material is improved in the electrode material layer.

The grinding mentioned above is preferably carried out, for example, by setting a short period of time, so as not to excessively break the carbon material layers coating the active material particles.

The method for preparing the active material particles is not particularly limited, and is appropriately used such that the active material particles each allow lithium to be inserted thereinto and extracted therefrom within the range of 0.5 V to 2 V (vs. $Li^+/Li$).

For example, in the case of preparing, as the active material particles, active material particles containing a niobium-titanium composite oxide, the preparation is preferably made by a method including: first preparing a precursor containing a titanium compound and a niobium compound; and firing the precursor at a temperature within the range of 700° C. to 1400° C.

(Second Embodiment)

According to the present embodiment, a nonaqueous electrolyte battery is provided. This nonaqueous electrolyte battery includes a positive electrode, a negative electrode including the active material for batteries according to the first embodiment, and a nonaqueous electrolyte.

The nonaqueous electrolyte battery according to the present embodiment may further include a separator disposed between the positive electrode and the negative electrode, and a container in which the positive electrode, the negative electrode, the separator, and the nonaqueous electrolyte are housed.

The positive electrode, the negative electrode, the nonaqueous electrolyte, the separator, and the container will be described in detail below.

1) Positive Electrode

The positive electrode includes a current collector, and a positive electrode material layer (positive electrode active material containing layer) including an active material and a binder, which is formed on one or both sides of the current collector.

For example, oxides, sulfides, polymers, and the like can be used for the active material. The compounds include, for example, manganese dioxide ($MnO_2$), iron oxide, copper oxide, nickel oxide, manganese composite oxides (e.g., $Li_xMn_2O_4$ or $Li_{0.5}MnO_2$ (where $0 \le x \le 1$)), nickel composite oxides (e.g., $Li_xNiO_2$ (where $0 \le x \le 1$)), cobalt composite oxides (e.g., $Li_xCoO_2$ (where $0 \le x \le 1$)), nickel-cobalt composite oxides (e.g., $Li_xNi_{1-y}Co_yO_2$ (where $0 \le x \le 1$, $0 \le y \le 1$)), manganese-cobalt composite oxides (e.g., $Li_xMn_yCo_{1-y}O_2$ (where $0 \le x \le 1$, $0 \le y \le 1$)), spinel-type manganese-nickel composite oxides (e.g., $Li_xMn_{2-y}Ni_yO_4$ (where $0 \le x \le 1$, $0 \le y \le 2$)), phosphate compounds having an olivine structure (e.g., $Li_xFePO_4$, $Li_xFe_{1-y}Mn_yPO_4$, $Li_xCoPO_4$ (where $0 \le x \le 1$, $0 \le y \le 1$)), sulfate iron ($Fe_2(SO_4)_3$), vanadium oxides (e.g., $V_2O_5$), and lithium-nickel-cobalt-manganese composite oxides, in which lithium can be inserted. As the active material, these compounds may be used singly, or multiple compounds may be used in combination.

For example, conductive polymer materials such as polyaniline and polypyrrole, or disulfide-based polymer materials can be used for the polymers. Sulfur (S) and carbon fluoride can be also used as the active material.

Preferred active materials include compounds which are high in positive electrode potential, for example, manganese composite oxides ($Li_xMn_2O_4$), nickel composite oxides ($Li_xNiO_2$), cobalt composite oxides ($Li_xCoO_2$), lithium-nickel-cobalt composite oxides ($LiNi_{1-y}Co_yO_2$), spinel-type manganese-nickel composite oxides ($Li_xMn_{2-y}NiO_4$), manganese-cobalt composite oxides ($Li_xMn_yCo_{1-y}O_2$), iron phosphate ($Li_xFePO_4$) which can contain lithium, and lithium-nickel-cobalt-manganese composite oxides. In this regard, x and y can fall within the ranges as described previously.

Above all, in the case of using a nonaqueous electrolyte including an ambient temperature molten salt, it is preferable to use, in terms of cycle life, iron phosphate which can contain lithium, $Li_xVPO_4F$ (where $0 \le x \le 1$), a lithium-nickel composite oxide, or a lithium-nickel-cobalt composite oxide. This is because the reactivity is reduced between the positive electrode active material and the ambient temperature molten salt.

The positive electrode active material preferably has a specific surface area of 0.1 $m^2$/g to 10 $m^2$/g. The positive electrode active material with a specific surface area of 0.1 $m^2$/g or more can sufficiently ensure insertion and extraction sites for lithium ions. The positive electrode active material with a specific surface area of 10 $m^2$/g or less is easily handled in industrial production, and can ensure a favorable charge-and-discharge cycle performance.

The binder can bind the active material and the current collector. Examples of the binder include polytetrafluoroethylene (PTFE), polyvinylidene fluoride (PVdF), and fluorine-containing rubbers.

The conductive agent is combined, if necessary, in order to enhance the current collecting performance, and reduce the contact resistance between the active material and the current collector. Examples of the conductive agent include carbonaceous materials such as acetylene black, carbon black, and/or graphite.

In the positive electrode material layer, the active material is preferably combined in a proportion of 80 weight % to 98 weight %. The binder is preferably combined in a proportion of 2 weight % to 20 weight %.

The amount of the binder is adjusted to 2 weight % or more, thereby providing sufficient electrode strength. In addition, a proportion adjusted to 20 weight % or less can reduce the amount of an insulator combined for the electrode, and reduce the internal resistance.

In the case of adding the conductive agent, the active material is preferably combined in a proportion of 77 weight % to 95 weight % in the positive electrode material layer. The binder is preferably combined in a proportion of 2 weight % to 20 weight %. The conductive agent is preferably combined in a proportion of 3 weight % to 15 weight %. The amount of the conductive agent is adjusted to 3 weight % or more, thereby making it possible to achieve the effect described above. In addition, the proportion adjusted to 15 weight % or less can reduce the decomposition of the nonaqueous electrolyte at the surface of the positive electrode conductive agent under high-temperature storage.

The current collector is preferably aluminum foil, or aluminum alloy foil containing an element such as Mg, Ti, Zn, Ni, Cr, Mn, Fe, Cu, and Si.

The aluminum foil or aluminum alloy foil is desirably 5 μm to 20 μm, more preferably 15 μm or less in thickness. The aluminum foil preferably has a purity of 99 weight % or more. The content of transition metals such as iron, copper, nickel, and chromium contained in the aluminum foil or aluminum alloy foil is preferably 1 weight % or less.

The positive electrode is prepared, for example, by making the active material, binder, and conductive agent which is arbitrary combined suspended in an appropriate solvent to prepare a slurry, applying the slurry to the positive electrode current collector, and drying the slurry to form the positive electrode material layer, followed by pressing. The positive electrode may be also prepared by forming the active material, binder, and conductive agent which is arbitrary combined into a pellet as the positive electrode material layer, and forming the pellet on a current collector.

2) Negative Electrode

The negative electrode includes a current collector, and a negative electrode material layer (negative electrode active material containing layer) including an active material, a conductive agent, and a binder, which is formed on one or both sides of the current collector.

The negative electrode active material includes the active material for batteries according to the first embodiment. This active material may contain at least one type of ion selected from the group consisting of alkali metal cations, alkaline-earth metal cations, transition metal cations, sulfide ions, sulfate ions, and chloride ions.

As an active material, the active material for batteries according to the first embodiment may be used singly, but may also be used in the form of further including other active materials. Anatase-type titanium dioxide $TiO_2$, rutile-type titanium dioxide $TiO_2$, beta titanium dioxide, $Li_2Ti_3O_7$ as ramsdellite type lithium titanate, $Li_4Ti_5O_{12}$ as spinel-type lithium titanate, niobium oxides, niobium-containing composite oxides, and the like can be used as the other active materials.

The conductive agent can enhance the current collecting performance of the active material, and reduce the contact resistance between the active material and the current collector. Examples of the conductive agent include carbonaceous materials such as acetylene black, carbon black, and graphite.

The binder is combined to fill gaps in the negative electrode active material dispersed, thereby making it possible to bind the active material and the conductive agent. Examples of the binder include polytetrafluoroethylene (PTFE), polyvinylidene fluoride (PVdF), fluorine-containing rubbers, and styrene-butadiene rubbers.

The active material, conductive agent, and binder in the negative electrode material layer are preferably respectively in the range of 68 weight % to 96 weight, 2 weight % to 30 weight %, and 2 weight % to 30 weight %. When the amount of the conductive agent is 2 weight % or more, the negative electrode material layer has a favorable current collecting performance. In addition, when the amount of the binder is 2 weight % or more, excellent cycle characteristics can be expected with sufficient binding performance between the negative electrode material layer and the current collector. On the other hand, the binder is preferably 30 weight % or less in order to increase the capacity of the nonaqueous electrolyte battery.

For the current collector, a material is used which is electrochemically stable at the lithium insertion and extraction potentials of the negative electrode active material. The current collector is preferably created from copper, nickel, stainless steel or aluminum, or an aluminum alloy containing an element such as Mg, Ti, Zn, Mn, Fe, Cu, and Si. The current collector is preferably 5 to 20 μm in thickness. The current collector with such a thickness can achieve a balance between the strength and reduction in weight for the negative electrode.

The negative electrode is prepared, for example, by suspending the active material, conductive agent, and binder in a general-purpose solvent to prepare a slurry, applying the slurry to the negative electrode current collector, and drying the slurry to form the negative electrode material layer, followed by pressing. The negative electrode may be also prepared by forming the active material, conductive agent, and binder into a pellet as the negative electrode material layer, and forming the pellet on the current collector.

3) Nonaqueous Electrolyte

The nonaqueous electrolyte may be, for example, a liquid nonaqueous electrolyte prepared by dissolving an electrolyte in an organic solvent, or a gel-like nonaqueous electrolyte of a composite of a liquid electrolyte and a polymer material.

For the liquid nonaqueous electrolyte, an electrolyte is preferably dissolved at a concentration of 0.5 mol/L to 2.5 mol/L in an organic solvent.

Examples of the electrolyte include lithium salts such as lithium perchlorate (LiClO$_4$), lithium hexafluorophosphate (LiPF$_6$), lithium tetrafluoroborate (LiBF$_4$), lithium hexafluoroarsenate (LiAsF$_6$), lithium trifluoromethanesulfonate (LiCF$_3$SO$_3$), and lithium bistrifluoromethylsufonylimide [LiN(CF$_3$SO$_2$)$_2$], or mixtures thereof. The electrolyte is preferably unlikely to be oxidized even at high potentials, and LiPF$_6$ is most preferred.

Examples of the organic solvent include cyclic carbonates such as propylene carbonate (PC), ethylene carbonate (EC), and vinylene carbonate, chain-like carbonates such as diethyl carbonate (DEC), dimethyl carbonate (DMC), and methyl ethyl carbonate (MEC), cyclic ethers such as tetrahydrofuran (THF), 2-methyltetrahydrofuran (2MeTHF), dioxolan (DOX), chain-like ethers such as dimethoxyethane (DME) and diethoxyethane (DEE), and γ-butyrolactone (GBL), acetonitrile (AN), and sulfolane (SL). These organic solvents can be used singly, or in the form of a mixed solvent.

Examples of the polymer material include polyvinylidene fluoride (PVdF), polyacrylonitrile (PAN), and polyethylene oxide (PEO).

Alternatively, an ambient temperature molten salt (ionic melt) containing lithium ion, a polymer solid electrolyte, an inorganic solid electrolyte, or the like may be used for the nonaqueous electrolyte.

The ambient temperature molten salt (ionic melt) refers to a compound that can be present as a liquid at an ambient temperature (15 to 25° C.), among organic salts of combinations of an organic cation and anion. Examples of the ambient temperature molten salt include ambient temperature molten salts that are themselves present as liquids, ambient temperature molten salts that turn into liquids by mixing with an electrolyte, and ambient temperature molten salts that turn into liquids by dissolution in an organic solvent. In general, the ambient temperature molten salts for use in nonaqueous electrolyte batteries have a melting point of 25° C. or lower. In addition, the organic cation typically has a quaternary ammonium skeleton.

The polymer solid electrolyte is prepared by dissolving an electrolyte in a polymer material, followed by solidification.

The inorganic solid electrolyte refers to a solid substance that has lithium ion conductivity.

4) Separator

The separator may be formed from, for example, a porous film or a non-woven fabric of synthetic resin, including polyethylene, polypropylene, cellulose, or polyvinylidene fluoride (PVdF). Above all, the porous film formed from polyethylene or polypropylene is molten at a certain temperature, and able to interrupt current, thus making it possible to improve safety.

5) Container

For the container, a laminate film of 0.5 mm or less in thickness or a metallic container of 1 mm or less in thickness can be used. The laminate film is more preferably 0.2 mm or less in thickness. The metallic container is more preferably 0.5 mm or less in thickness, and further preferably 0.2 mm or less in thickness.

Examples of the container shape include flattened shapes (thin shapes), cuboid shapes, cylindrical shapes, coin shapes, and button shapes. Examples of the container include, for example, exterior materials for small-size batteries built into portable electronic devices and the like, and exterior materials of containers for large-size batteries built into two-wheel to four-wheel automobiles and the like, depending on the battery dimensions.

For the laminate, a multilayer film is used which has a metallic layer interposed between resin layers. The metallic layer is aluminum foil or aluminum alloy foil for reduction in weight. For the resin layer, polymer materials can be used such as, for example, polypropylene (PP), polyethylene (PE), nylon, and polyethylene terephthalate (PET). The laminate film can be formed into the shape of the container through sealing by thermal fusion bonding.

The metallic container is created from aluminum, aluminum alloy, or the like. The aluminum alloy is preferably an alloy containing an element such as magnesium, zinc, and silicon. When the alloy contains a transition metal such as iron, copper, nickel, and chromium, the content of the metal is preferably 1 weight % or less. Thus, long-term reliability and radiation performance can be improved dramatically under high-temperature environments.

Next, an example of the nonaqueous electrolyte battery according to the present embodiment will be specifically described with reference to the drawings.

Figure 2:
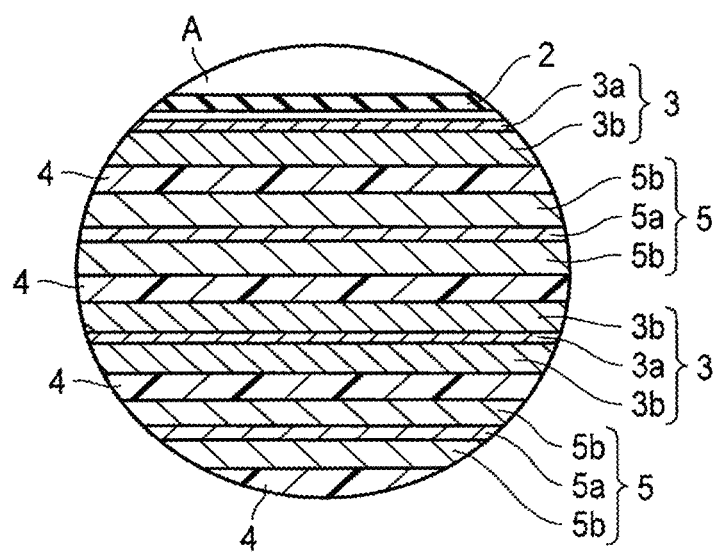
FIG. 2 shows an enlarged cross-sectional view of an A part in FIG. 1.

FIG. 1 is a cross-sectional view illustrating an example of the nonaqueous electrolyte battery according to the present embodiment. FIG. 2 is an enlarged cross-sectional view of an A part in FIG. 1.

The nonaqueous electrolyte battery 10 shown in FIGS. 1 and 2 includes a flattened rolled electrode group 1. As shown in FIG. 1, the flattened rolled electrode group 1 is housed in a sac-like exterior material 2 of a laminate film with a metallic layer interposed between two resin layers. The flattened rolled electrode group 1 is formed by spirally rolling a stacked body obtained by stacking in the order of a negative electrode 3, a separator 4, a positive electrode 5, and a separator 4 from the outside, and pressing the spirally rolled body into a shape.

As shown in FIG. 2, the negative electrodes 3 each have a negative electrode current collector 3a and a negative electrode material layer 3b. The negative electrode material layers 3b include therein the active material for batteries according to the first embodiment. The negative electrode 3 as an outermost layer is configured to have the negative electrode material layer 3b formed on one inner side of the negative electrode current collector 3a, as shown in FIG. 2. The other negative electrodes 3 each have the negative electrode material layer 3b formed on both sides of the negative electrode current collector 3a.

As shown in FIG. 2, the positive electrodes 5 each have a positive electrode material layer 5b formed on both sides of a positive electrode current collector 5a. The positive electrode material layers 5b are opposed to the negative electrode material layers 3b with the separators 4 interposed therebetween.

As shown in FIG. 1, near an outer peripheral end of the rolled electrode group 1, a negative electrode terminal 6 is connected to the negative electrode current collector 3a of the negative electrode 3 as an outermost layer, whereas a positive electrode terminal 7 is connected to the positive electrode current collector 5a of the inner positive electrode 5. The negative electrode terminal 6 and the positive electrode terminal 7 are extended from openings of the sac-like exterior material 2 to the outside. The liquid nonaqueous electrolyte is injected from, for example, the openings of the sac-like exterior material 2. The openings of the sac-like exterior material 2 are heat-sealed with the negative electrode terminal 6 and positive electrode terminal 7 interposed, thereby completely hermetically enclosing the rolled electrode group 1 and the liquid nonaqueous electrolyte.

The negative electrode terminal 6 is formed from a material that is electrochemically stable at the potential of the negative electrode active material for lithium insertion and extraction, and conductive. Specifically, the terminal is formed from copper, nickel, stainless steel, or aluminum, or an aluminum alloy containing an element such as Mg, Ti, Zn, Mn, Fe, Cu, and Si. The negative electrode terminal 6 is preferably formed from the same material as the negative electrode current collector 3a in order to reduce the contact resistance between the terminal and the negative electrode current collector.

The positive electrode terminal 7 is formed from a material that has electrical stability at the potential with respect to lithium within the range of 3 V to 5 V (vs. Li/Li+), preferably 3.0 V to 4.25 V, and conductivity. Specifically, the terminal is formed from aluminum, or an aluminum alloy containing an element such as Mg, Ti, Zn, Ni, Cr, Mn, Fe, Cu, and Si. The positive electrode terminal 7 is preferably formed from the same material as the positive electrode current collector 5a in order to reduce the contact resistance between the terminal and the positive electrode current collector 5a.

The nonaqueous electrolyte battery according to the present embodiment is not limited to the configuration of the example shown in FIGS. 1 and 2 as described previously. The nonaqueous electrolyte battery according to the present embodiment may be a battery configured, for example, as shown in FIGS. 3 and 4.

FIG. 3 is a partially cutaway perspective view schematically illustrating another nonaqueous electrolyte battery according to the present embodiment. FIG. 4 is an enlarged cross-sectional view of a B part in FIG. 3.

The nonaqueous electrolyte battery 10 shown in FIGS. 3 and 4 includes a stacked electrode group 11. As shown in FIG. 3, the stacked electrode group 11 is housed in a container member 12 of a laminate film with a metallic layer interposed between two resin films. As shown in FIG. 4, the stacked electrode group 11 has a structure obtained by alternately stacking positive electrodes 13 and negative electrodes 14 with separators 15 interposed therebetween. There are a plurality of positive electrodes 13, each including a positive electrode current collector 13a and a positive electrode material layer 13b supported on both sides of the positive electrode current collector 13a. There are a plurality of negative electrodes 14, each including a negative electrode current collector 14a and a negative electrode active material containing layer 14b supported on both sides of the negative electrode current collector 14a. The negative electrode current collector 14a of each negative electrode 14 has a side protruded from the negative electrode 14. The protruded negative electrode current collector 14a is electrically connected to a strip negative electrode terminal 16. The strip negative electrode terminal 16 has an end extended from the container member 12 to the outside. In addition, although not shown, the positive electrode current collector 13a of the positive electrode 13 has a side located on the side opposite to the protruded side of the negative electrode current collector 14a, which is protruded from the positive electrode 13. Although also not shown, the positive electrode current collector 13a protruded from the positive electrode 13 is electrically connected to a strip positive electrode terminal 17. The strip positive electrode terminal 17 has an end located on the side opposite to the negative electrode terminal 16, and extended from a side of the container member 12 to the outside.

The nonaqueous electrolyte battery according to the second embodiment includes the negative electrode including the active material for batteries according to the first embodiment. Therefore, the nonaqueous electrolyte battery according to the present embodiment can achieve excellent cycle characteristics.

(Third Embodiment)

According to a third embodiment, a battery pack is provided. This battery pack includes the nonaqueous electrolyte battery according to the second embodiment.

The battery pack according to the present embodiment includes one or more nonaqueous electrolyte batteries (unit cells) according to the second embodiment. In the case of including a plurality of unit cells, the respective unit cells can be electrically connected in series, in parallel, or with a combination of series connection and parallel connection to constitute a battery module. The battery pack according to the present embodiment may include a plurality of battery modules.

The battery pack according to the third embodiment may further comprise a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including regenerative energy caused by power of vehicles such as automobiles) is provided to the battery pack via the external power distribution terminal.

Figure 5:
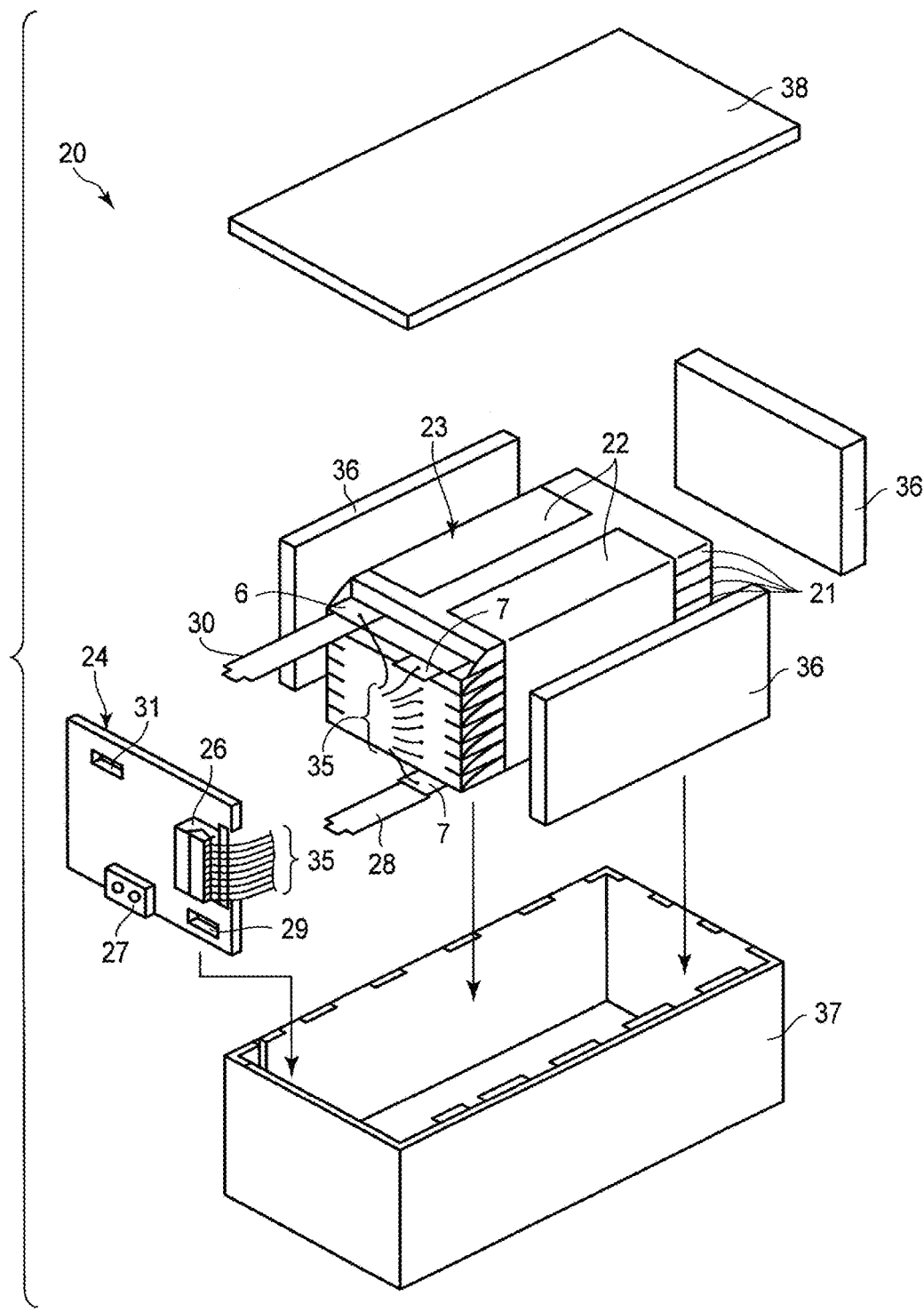
FIG. 5 shows an exploded perspective view illustrating an example of a battery pack according to a third embodiment.
Figure 6:
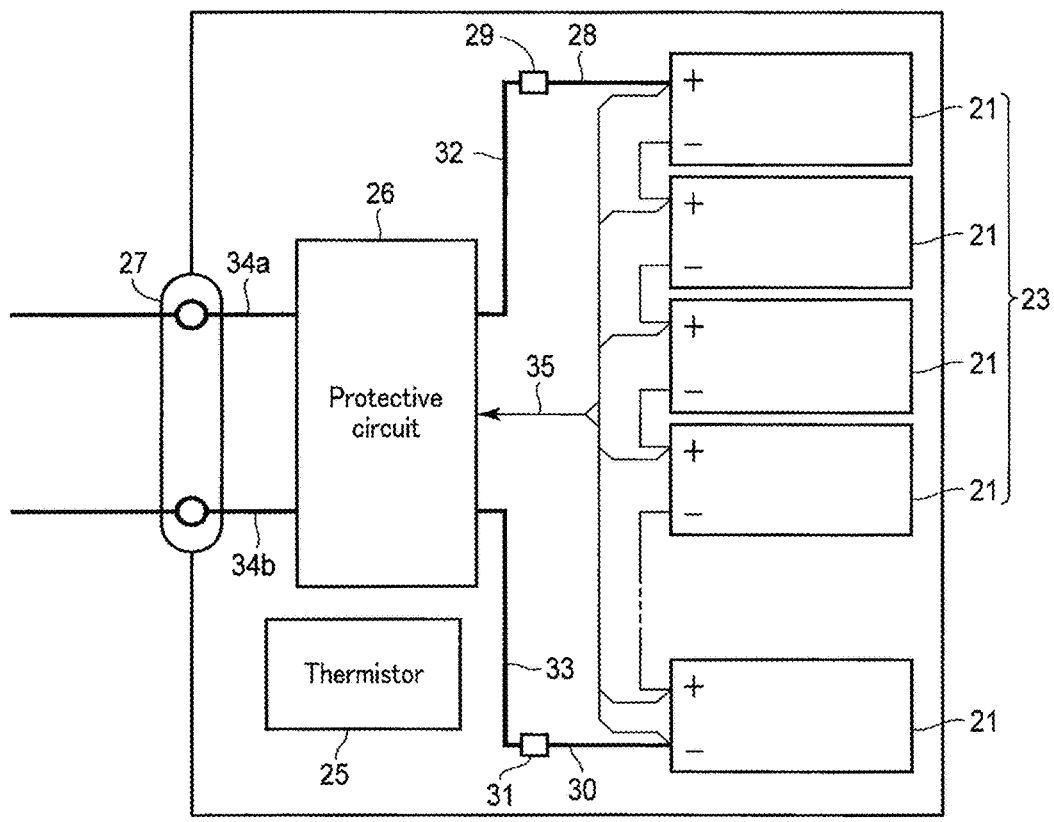
FIG. 6 shows a block diagram illustrating an electrical circuit of the battery pack in FIG. 5.

Next, the battery pack according to the present embodiment will be described with reference to the drawing. FIG. 5 is an exploded perspective view illustrating an example of the battery pack according to the present embodiment. FIG. 6 is a block diagram illustrating an electrical circuit of the battery pack in FIG. 5.

The battery pack 20 shown in FIGS. 5 and 6 includes a plurality of unit cells 21. The unit cell 21 corresponds to the nonaqueous electrolyte battery 10 shown in FIGS. 1 and 2.

As shown in FIG. 5, the unit cells 21 are stacked such that a negative electrode terminal 6 and a positive electrode terminal 7 extended to the outside are aligned in the same orientation, and fastened with an adhesive tape 22, thereby constituting a battery module 23. The unit cells 21 are electrically series-connected to each other as shown in FIG. 6. The electrically series-connected unit cells 21 constitute the battery module 23.

As shown in FIG. 5, a printed wiring board 24 is disposed to be opposed to side surfaces of the unit cells 21 from which the negative electrode terminal 6 and the positive electrode terminal 7 are extended. On the printed wiring board 24, a thermistor 25, a protective circuit 26, and an energizing terminal 27 to an external device are mounted as shown in FIG. 6. Further, an insulating plate (not shown) is attached to a surface of the printed wiring board 24 opposed to the battery module 23, in order to avoid unnecessary connections to wirings of the battery module 23.

As shown in FIG. 6, a positive side lead 28 is connected to a positive electrode terminal 7 located on the lowermost layer of the battery module 23, with an end of the lead inserted into a positive side connector 29 of the printed wiring board 24, and electrically connected. A negative side lead 30 is connected to a negative electrode terminal 6 located on the uppermost layer of the battery module 23, with an end of the lead inserted into a negative side connector 31 of the printed wiring board 24, and electrically connected. These connectors 29 and 31 are connected to the protective circuit 26 through wirings 32 and 33 formed on the printed wiring board 24.

The thermistor 25 is used for detecting the temperature of the unit cell 21. The detected signal is transmitted to the protective circuit 26. The protective circuit 26 can, under a predetermined conduction, break a plus wiring 34a and a minus wiring 34b between the protective circuit 26 and the energizing terminal 27 to an external device. An example of the predetermined conduction is, for example, when the temperature detected by the thermistor 25 is equal to or higher than a predetermined temperature. In addition, another example of the predetermined condition is when over-charge, over-discharge, overcurrent, or the like is detected in the unit cells 21. The detection of over-charge or the like is directed to the individual unit cells 21 or all of the unit cells 21. In the case of detecting over-charge or the like of the individual unit cells 21, the voltages of the cells may be detected, or the potential of the positive electrode or negative electrode may be detected. In the latter case, lithium electrodes for use as reference electrodes are inserted into individual unit cells 21. In the case of the nonaqueous electrolyte battery shown in FIGS. 5 and 6, a wiring 35 for voltage detection is connected to each of the unit cells 21, and detected signals are transmitted to the protective circuit 26 through the wiring 35.

As shown in FIG. 5, protective sheets 36 of a rubber or a resin are disposed respectively on the three side surfaces of the battery module 23, excluding the side surface from which the positive electrode terminal 7 and the negative electrode terminal 6 are protruded.

The battery module 23 is housed in a housing container 37, along with the respective protective sheets 36 and the printed wiring board 24. More specifically, the protective sheets 36 are disposed respectively on both inner surfaces of a housing container 37 in the longer side direction and an inner surface thereof in the shorter side direction, whereas the printed wiring board 24 is disposed on the inner surface thereof on the opposite side in the shorter side direction. The battery module 23 is located in the space surrounded by the protective sheets 36 and the printed wiring board 24. A lid 38 is attached to the upper surface of the housing container 37.

It is to be noted that for fixing the battery module 23, a heat-shrinkable tape may be used in place of an adhesive tape 22. In this case, a protective sheet is disposed on both side surfaces of the battery module, the heat-shrinkable tape is wrapped, and the heat-shrinkable tape is then shrunk by heat to bind the battery module.

While FIGS. 5 and 6 show the embodiment with the plurality of unit cells 21 series-connected, the cells may be connected in parallel in order to increase the battery capacity. Alternatively, a series connection and a parallel connection may be combined. Assembled battery packs can be also further connected in series and/or in parallel.

In addition, the embodiment of the battery pack according to the present embodiment may be appropriately changed depending on the intended use. The battery pack is used in a preferred manner for intended uses required to have cycle characteristics when a large current is extracted. Specifically, the battery pack is used as a power source for a digital camera, or as an in-car battery, for example, for two-wheel to four-wheel hybrid electric automobiles, two-wheel to four-wheel electric automobiles, and assisted bicycles. In particular, as an in-car battery, the battery pack is used in a preferred manner.

In a vehicle having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and electric trains.

The battery pack according to the third embodiment includes the nonaqueous electrolyte battery according to the second embodiment, and thus can achieve excellent cycle characteristics.

(Fourth Embodiment)

According to a fourth embodiment, a vehicle is provided. The vehicle includes a battery pack according to the third embodiment.

FIG. 10 shows an example of an automobile which includes a battery pack according to a third embodiment.

The automobile 41 shown in FIG. 10 includes a battery pack 42 which is an example of the battery pack according to the third embodiment mounted in its engine room. The mounting position is not limited to engine rooms. For example, the battery pack may also be mounted in rear parts of automobiles or under seats.

EXAMPLES

Examples will be described below, but the embodiments are not to be considered limited to the examples described below.

Example 1

Manufacture of Active Material

As starting raw materials, a powder of titanium dioxide $TiO_2$ and a powder of niobium pentoxide $Nb_2O_5$ were used. These powders were weighed at a molar ratio of 1:1, and then subjected to mixing and grinding in a wet ball mill with ethanol as a solvent. After the grinding, the solvent and the powders were separated by carrying out filtration and drying, thereby providing a precursor powder including titanium dioxide and niobium pentoxide. Then, the precursor powder was put in an alumina crucible, and subjected to firing over 12 hours at 1000° C. After the firing, the fired product was subjected to grinding, thereby providing a powder. This powder was again subjected to mixing and grinding in a wet ball mill, and subjected to filtration and drying to obtain a calcined powder. This powder was again put in an alumina crucible, and subjected to firing over 12 hours at 1100° C. Thereafter, the powder was subjected to grinding, thereby providing an intended active material powder.

This active material powder was subjected to XRD (X-ray Diffraction) measurement. It has been confirmed that the active material powder has a single-phase structure regarded as a $Nb_2TiO_7$ phase, because peaks of the XRD patterns obtained are all adequately coincident with the peaks listed on the PDF No. 01-077-1374 in terms of the values of intensity and 2θ. In addition, the average particle size (d50) calculated at a cumulative frequency of 50% was 0.9 μm, when particle sizes were determined with a laser-diffraction particle size distribution measurement system.

Next, the obtained active material powder was conjugated with a carbon material. Specifically, polyvinyl alcohol (PVA) with a degree of saponification of 95% was mixed in pure water as a carbon-containing compound, thereby preparing a 15 mass % aqueous solution of PVA. The active material powder was mixed and stirred in the aqueous solution to prepare a dispersion liquid. The mass ratio of the active material particles and the PVA was 15 mass % in the dispersion liquid. The pH of the dispersion liquid was adjusted to fall within the range of pH 11.5 to 12.4 by adding an ammonia aqueous solution. Then, the dispersion liquid, including the dispersed composite that the surfaces of the $Nb_2TiO_7$ particles as active material particles are at least partially covered with the PVA phase as a carbon-containing compound phase, was subjected to spray drying.

Thereafter, the powder was collected, dried over 12 hours at 100° C. to sufficiently remove the solvent, and then subjected to firing for carbonization under a reducing atmosphere. The firing was carried out over 1 hour at 700° C. under an inert atmosphere.

The agglomeration of the active material obtained was lightly broken with the use of a mortar. For the broken active material, the average particle size (d50) calculated at a cumulative frequency of 50% was 3.5 μm, when particles were determined with a laser-diffraction particle size distribution measurement system. The active material obtained in this way was regarded as an active material for evaluation.

In addition, the obtained active material was checked by TEM observation for the state of the coating carbon. First, a Ru metal was adsorbed by vapor deposition onto the active material surface. Thereafter, the powder was embedded in a resin, and made into a thin film by ion milling with the use of a DualMill 600 from GATAN, and random primary particles were subjected to TEM observation. With the use of an H-9000UHR III from Hitachi, Ltd as a TEM analyzer, the evaluation was conducted at acceleration voltage: 300 kV, and image magnification: 2000000-fold magnification. FIG. 7 shows an example of the TEM image obtained. A black part with contrast, which has the largest area, indicates an active material particle 101. In addition, white or gray parts with contrast indicate a carbon material layer 102, a Ru coat 103, and a resin 104 in order from the part to adjacent to the active material particle 101. The Ru coat 103 is shown in gray with contrast, and the part shown between the active material particle 101 and the Ru coat 103 can be thus regarded as the carbon material layer 102. The carbon material layer 102 was approximately 2.9 nm in thickness, highly smooth, and a uniform coating.

Figure 8:
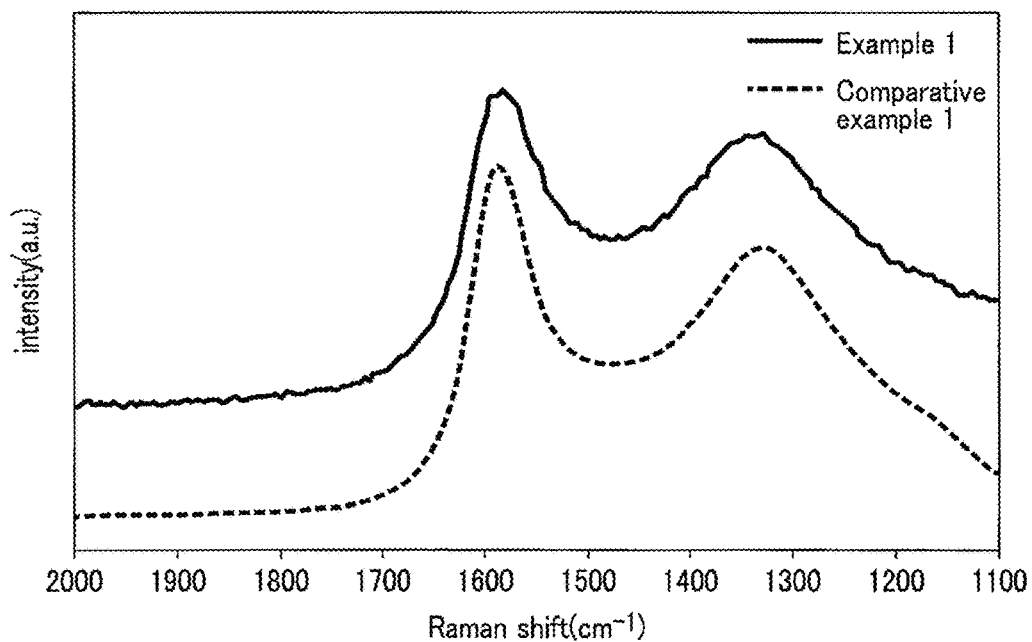
FIG. 8 shows Raman charts according to Example 1 and Comparative Example 1.

Next, the obtained active material was subjected to microscopic Raman spectrometry. With the use of a Thermo Fisher Scientific ALMEGA as a measurement system, a Raman spectrum was acquired for the active material surface, with a wavelength from a measurement light source: 532 nm; slight size: 25 μm; laser intensity: 10%; exposure time: 5 s, and cumulative number: 10 times. The spectrum obtained is shown in FIG. 8. The spectrum is shown through normalization by dividing the measured intensities by the measured intensity observed for a G band. FIG. 8 also shows the result of a Raman spectrum according to Comparative Example 1 as will be described later.

Figure 9:
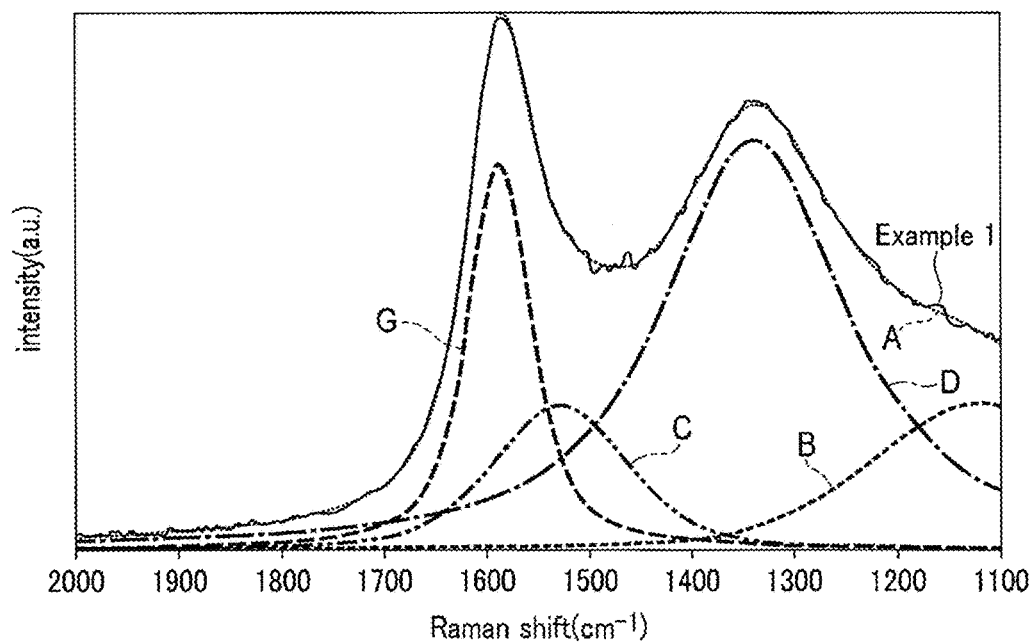
FIG. 9 shows a diagram showing the result of carrying out fitting for a Raman spectrum according to Example 1.

FIG. 9 is a diagram showing the result of carrying out fitting by the method of least squares with the use of a Lorenz/Gauss function as a fitting function in the measurement range of 1100 $cm^{-1}$ to 2000 $cm^{-1}$, for the Raman spectrum according to Example 1 in FIG. 8.

In FIG. 9, a line A shows a line obtained by approximating the Raman spectrum according to Example 1. The high peak observed around 1580 $cm^{-1}$ was regarded as a G band (G), whereas the high peak observed around 1330 $cm^{-1}$ was regarded as a D band (D), a peak (B) shown around 1250 $cm^{-1}$ and a peak (C) shown around 1500 $cm^{-1}$ were further presumed to be also observed, and fitting was performed on the basis of the four peaks in total. As a result of calculating the full widths at half maximum, the full widths at half maximum were 205 $cm^{-1}$ for the D band, and 78 $cm^{-1}$ for the G band.

Furthermore, the BET specific surface area S measured by a nitrogen adsorption method was S=3.0 ($m^2$/g) for the obtained active material. In addition, the mass ratio M of the carbon material layer to the total mass of the active material was M 2.1 mass %, which was obtained by the high-frequency-infrared absorption method. The ratio of S/M calculated from the foregoing was S/M=1.43 $m^2$/g.

Next, a battery was prepared as described below.

The obtained niobium-titanium composite oxide powder: 100 mass %, acetylene black: 10 mass % as a conductive aid, and polyvinylidene fluoride (PVdF): 10 mass % as a binder were mixed with the addition of N-methylpyrrolidone (NMP) thereto as a dispersion solution, thereby providing a slurry. This slurry was applied to both sides of a current collector of aluminum foil of 12 μm in thickness, dried, and then pressed to prepare a negative electrode. It is to be noted that the negative electrode was adjusted to 60 g/m² in weight per area. As a positive electrode, a $LiNi_{0.5}Co_{0.2}Mn_{0.3}O_2$ powder: 100 mass %, acetylene black: 10 mass % as a conductive aid, and polyvinylidene fluoride (PVdF): 10 mass % as a binder were added to N-methylpyrrolidone (NMP), and mixed to provide a slurry, this slurry was applied to one side of a current collector of aluminum foil of 12 μm in thickness, dried, and then pressed, thereby preparing an electrode. The weight per area (g/m²) of the positive electrode was adjusted such that the ratio between the positive electrode charge capacity A (mAh/g) and the negative electrode charge capacity B (mAh/g) was A/B=1±0.05.

The obtained positive electrode and negative electrode were stacked in a zig-zag manner with a separator interposed therebetween, and housed in an exterior material of a laminate film after welding respective terminals for the positive and negative electrodes, thereby preparing a nonaqueous electrolyte battery with a capacity of 1.0 Ah and a potential range of 1.5 to 3.0 V. As an electrolyte, a solution was used where 1 M of $LiPF_6$ was dissolved in a mixed solvent of containing propylene carbonate and diethyl carbonate at a volume ratio of 1:2.

The nonaqueous electrolyte battery prepared as described above was subjected to 2C/2C charge and discharge at an evaluation temperature of 45° C. in the potential range of 1.0 V to 3.0 V, and the ratio was calculated between the first-cycle charge capacity and the 1000th-cycle discharge capacity. The foregoing results are shown in Tables 1 and 2 below.

Example 2

An active material was manufactured by the same method as in Example 1, except that the mass ratio of the active material particles and the PVA was 30 mass % in the dispersion liquid. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a non-aqueous electrolyte battery with the use of the obtained active material were made by the same methods as in Example 1. The results are shown in Tables 1 and 2.

Example 3

A dilute sulfuric acid solution of titanyl sulfate and an ethanol solution of niobium chloride were used as starting raw materials. Both solutions were mixed such that the molar ratio of Nb/Ti was 7:3, and the pH of the dispersion liquid was adjusted to 8 by adding an ammonia water while stirring. The obtained dispersion liquid was transferred to an autoclave container, and heated over 5 hours at 170° C. The obtained dispersion liquid was subjected to filtration, and washed with pure water to obtain precursor particles of the active material.

The structure of the obtained precursor particles was confirmed with the use of an X-ray diffraction measurement. As a result, it has been determined that the precursor is amorphous with a halo peak observed.

Next, the obtained precursor particles were subjected to firing in the atmosphere over 1 hour at 1100° C. Furthermore, following this firing, additional firing in the atmosphere was carried out over 5 hours at 600° C. Thereafter, agglomeration was broken in a wet bead mill. In this way, the active material was synthesized.

The product obtained by the firing was subjected to XRD measurement. It has been confirmed that the product has a single-phase structure regarded as a $Nb_2TiO_7$ phase, because peaks of the XRD patterns obtained are all coincident favorably with the peaks listed on the PDF No. 01-077-1374 in terms of the values of intensity and 2θ.

The average particle size (d50) calculated at a cumulative frequency of 50% was 0.6 μm, when the particle sizes of the active material particles before coating with the carbon material were measured with a laser-diffraction particle size distribution measurement system, and the BET specific surface area was S 10.6 m²/g for the active material particles before carbon coating.

Spray drying was carried out by the method as in Example 1 except that the mass ratio of the active material particles and PVA in the dispersion liquid was made 20 mass % with the use of the obtained active material particles, and thereafter, firing was carried out.

In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a nonaqueous electrolyte battery with the use of the obtained active material were made by the same methods as in Example 1. The results are shown in Tables 1 and 2.

Example 4

An active material was manufactured by the same method as in Example 1, except that the mass ratio of the active material particles and the PVA was 9 mass % in the dispersion liquid. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a nonaqueous electrolyte battery with the use of the obtained active material were made by the same methods as in Example 1. The results are shown in Tables 1 and 2.

Example 5

An active material was manufactured by the same method as in Example 1, except that the mass ratio of the active material particles and the PVA was 4.5 mass % in the dispersion liquid. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a nonaqueous electrolyte battery with the use of the obtained active material were made by the same methods as in Example 1. The results are shown in Tables 1 and 2.

Example 6

An active material was manufactured by the same method as in Example 1, except that the mass ratio of the active material particles and the PVA was 58 mass % in the dispersion liquid. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a nonaqueous electrolyte battery with the use of the obtained active material were made by the same methods as in Example 1. The results are shown in Tables 1 and 2.

Comparative Example 1

An active material was manufactured by the same method as in Example 1, except that the mass ratio of the active material particles and the PVA was 72 mass % in the dispersion liquid. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a nonaqueous electrolyte battery with the use of the obtained active material were made by the same methods as in Example 1. The results are shown in Tables 1 and 2.

Comparative Example 2

An active material was manufactured by the same method as in Example 1, except that the mass ratio of the active material particles and the PVA was 4 mass % in the dispersion liquid. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a nonaqueous electrolyte battery with the use of the obtained active material were made by the same methods as in Example 1. The results are shown in Tables 1 and 2.

Comparative Example 3

An active material was manufactured by the same method as in Example 1, except that an aqueous solution of PVA with a degree of saponification of 70% was used without adjustment of the pH. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a nonaqueous electrolyte battery with the use of the obtained active material were made by the same methods as in Example 1. The results are shown in Tables 1 and 2.

Comparative Example 4

An active material was manufactured by the same method as in Example 1, except that sucrose was used as a carbon-containing compound without adjustment of the pH. In addition, the measurement of average particle size (d50), TEM observation, microscopic Raman spectrometry and fitting thereof, and measurement of BET specific surface area were made for the obtained active material by the same methods as in Example 1. In the TEM observation, the carbon material layer was low in uniformity, and the particles were remarkably agglomerated.

In addition, the preparation and evaluation of an electrode and a nonaqueous electrolyte battery with the use of the obtained active material were made by the same methods as in Example 1. The results are shown in Tables 1 and 2.

Comparative Example 5

An active material was manufactured by the same method as in Example 1, except that maltose was used as a carbon-containing compound without adjustment of the pH. In addition, the measurement of average particle size (d50), TEM observation, microscopic Raman spectrometry and fitting thereof, and measurement of BET specific surface area were made for the obtained active material by the same methods as in Example 1. In the TEM observation, the carbon material layer was low in uniformity, and the particles were remarkably agglomerated.

In addition, the preparation and evaluation of an electrode and a nonaqueous electrolyte battery with the use of the obtained active material were made by the same methods as in Example 1. The results are shown in Tables 1 and 2.

Example 7

An active material was manufactured by the same method as in Example 1, except that active material particles consist of a single phase of spinel-type lithium-titanium oxide $Li_4Ti_5O_{12}$ were used as the active material particles. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a nonaqueous electrolyte battery with the use of the obtained active material were made by the same methods as in Example 1, except that the range of the operation potential was adjusted to 2.8 to 1.5 V. The results are shown in Tables 1 and 2.

Comparative Example 6

An active material was manufactured by the same method as in Example 1, except for the use of, as the active material particles, active material particles consist of a single phase of spinel-type lithium-titanium oxide $Li_4Ti_5O_{12}$, and the use of maltose as a carbon-containing compound, without adjusting the pH. It is to be noted that while the pH of the dispersion liquid was not adjusted, the pH was 10 due to Li contained in the active material.

In addition, the measurement of average particle size (d50), TEM observation, microscopic Raman spectrometry and fitting thereof, and measurement of BET specific surface area were made for the obtained active material by the same methods as in Example 1. In the TEM observation, the carbon material layer was low in uniformity, and the particles were remarkably agglomerated.

In addition, the preparation and evaluation of an electrode and a nonaqueous electrolyte battery with the use of the obtained active material were made by the same methods as in Example 1, except that the range of the operation potential was adjusted to 2.8 to 1.5 V. The results are shown in Tables 1 and 2.

Example 8

An active material was manufactured by the same method as in Example 1, except that active material particles consist of a single phase of strontium-containing orthorhombic lithium-titanium compound $Li_2SrTi_6O_{14}$ were used as the active material. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a non-aqueous electrolyte battery with the use of the obtained active material were made by the same methods as in Example 1. The results are shown in Tables 1 and 2.

Comparative Example 7

An active material was manufactured by the same method as in Example 1, except for the use of, as the active material, active material particles consist of a single phase of strontium-containing orthorhombic lithium-titanium compound $Li_2SrTi_6O_{14}$, and the use of sucrose as a carbon-containing compound, without adjusting the pH. It is to be noted that while the pH of the dispersion liquid was not adjusted, the pH was 10 due to Li contained in the active material.

In addition, the measurement of average particle size (d50), TEM observation, microscopic Raman spectrometry and fitting thereof, and measurement of BET specific surface area were made for the obtained active material by the same methods as in Example 1. In the TEM observation, the carbon material layer was low in uniformity, and the particles were remarkably agglomerated.

In addition, the preparation and evaluation of an electrode and a nonaqueous electrolyte battery with the use of the obtained active material were made by the same methods as in Example 1. The results are shown in Tables 1 and 2.

Example 9

An active material was manufactured by the same method as in Example 1, except that active material particles consist of a single phase of orthorhombic sodium-containing lithium-titanium compound $Li_2Na_2Ti_2O_{14}$ were used as the active material. In addition, the measurement of average particle size (d50), TEM observation, microscopic Raman spectrometry and fitting thereof, and measurement of BET specific surface area were made for the obtained active material by the same methods as in Example 1. In addition, the preparation and evaluation of an electrode and a non-aqueous electrolyte battery with the use of the obtained active material were made by the same methods as in Example 1. The results are shown in Tables 1 and 2.

Comparative Example 8

An active material was manufactured by the same method as in Example 1, except for the use of, as the active material, active material particles consist of a single phase of orthorhombic sodium-containing lithium-titanium compound $Li_2Na_2Ti_2O_{14}$, and the use of sucrose as a carbon-containing compound, without adjusting the pH. It is to be noted that while the pH of the dispersion liquid was not adjusted, the pH was 10 due to Li contained in the active material.

In addition, the measurement of average particle size (d50), TEM observation, microscopic Raman spectrometry and fitting thereof, and measurement of BET specific surface area were made for the obtained active material by the same methods as in Example 1. In the TEM observation, the carbon material layer was low in uniformity, and the particles were remarkably agglomerated.

In addition, the preparation and evaluation of an electrode and a nonaqueous electrolyte battery with the use of the obtained active material were made by the same methods as in Example 1. The results are shown in Tables 1 and 2.

TABLE 1

| | Carbon-Containing Compound | Active Material Composition | Firing Temperature for Carbonization | Degree of Saponification | pH | Mass Ratio of Active Material Particles/Carbon-Containing Compound (mass %) |
|---|---|---|---|---|---|---|
| Example 1 | PVA | $TiNb_2O_7$ | 700° C. | 95 | 12 | 15 |
| Example 2 | PVA | $TiNb_2O_7$ | 700° C. | 95 | 12 | 30 |
| Example 3 | PVA | $TiNb_2O_7$ | 700° C. | 95 | 12 | 20 |
| Example 4 | PVA | $TiNb_2O_7$ | 700° C. | 95 | 12 | 9 |
| Example 5 | PVA | $TiNb_2O_7$ | 700° C. | 95 | 12 | 4.5 |
| Example 6 | PVA | $TiNb_2O_7$ | 700° C. | 95 | 12 | 58 |
| Comparative Example 1 | PVA | $TiNb_2O_7$ | 700° C. | 95 | 12 | 72 |
| Comparative Example 2 | PVA | $TiNb_2O_7$ | 700° C. | 95 | 12 | 4 |
| Comparative Example 3 | PVA | $TiNb_2O_7$ | 700° C. | 70 | 7 | 15 |
| Comparative Example 4 | sucrose | $TiNb_2O_7$ | 700° C. | — | 7 | 15 |
| Comparative Example 5 | maltose | $TiNb_2O_7$ | 700° C. | — | 7 | 15 |
| Example 7 | PVA | $Li_4Ti_5O_{12}$ | 700° C. | 95 | 12 | 15 |
| Comparative Example 6 | sucrose | $Li_4Ti_5O_{12}$ | 700° C. | — | 10 | 15 |
| Example 8 | PVA | $Li_2SrTi_6O_{14}$ | 700° C. | 95 | 12 | 15 |
| Comparative Example 7 | sucrose | $Li_2SrTi_6O_{14}$ | 700° C. | — | 10 | 15 |
| Example 9 | PVA | $Li_2Na_2Ti_6O_{14}$ | 700° C. | 95 | 12 | 15 |
| Comparative Example 8 | sucrose | $Li_2Na_2Ti_6O_{14}$ | 700° C. | — | 10 | 15 |

TABLE 2

| | d50 after Coating (μm) | Film Thickness (nm) | Specific Surface Area S (m²/g) | Mass Ratio M (mass %) | S/M | Intensity Ratio (IG/ID) | Full Width at Half Maximum for D Band (cm⁻¹) | Full Width at Half Maximum for G Band (cm⁻¹) | Cycle Maintenance Ratio after 100 Cycles (%) |
|---|---|---|---|---|---|---|---|---|---|
| Example 1 | 3.5 | 2.9 | 3.02 | 2.11 | 1.43 | 0.93 | 205 | 78 | 1830 |
| Example 2 | 4.1 | 3.9 | 2.92 | 4.21 | 0.69 | 1.09 | 197 | 81 | 2100 |
| Example 3 | 1.2 | 2.3 | 11.2 | 8.13 | 1.38 | 1.08 | 187 | 82 | 1490 |
| Example 4 | 3.2 | 1.7 | 3.11 | 1.21 | 2.57 | 0.98 | 199 | 71 | 1510 |
| Example 5 | 2.8 | 0.7 | 3.15 | 0.63 | 5.00 | 0.95 | 186 | 79 | 1120 |
| Example 6 | 4.7 | 10.2 | 4.56 | 8.21 | 0.56 | 1.12 | 196 | 78 | 1110 |
| Comparative Example 1 | 5.6 | 12.1 | 4.68 | 10.25 | 0.46 | 0.94 | 191 | 76 | 890 |
| Comparative Example 2 | 2.5 | 0.3 | 3.15 | 0.51 | 6.18 | 1.18 | 194 | 83 | 820 |
| Comparative Example 3 | 8.1 | 2.8 | 13.15 | 2.12 | 6.20 | 1.12 | 176 | 74 | 850 |
| Comparative Example 4 | 7.1 | 2.2 | 11.53 | 2.11 | 5.46 | 1.28 | 148 | 62 | 1010 |
| Comparative Example 5 | 7.3 | 2.1 | 11.62 | 2.21 | 5.26 | 1.3 | 153 | 64 | 980 |
| Example 7 | 3.2 | 2.8 | 3.31 | 2.12 | 1.56 | 0.91 | 912 | 72 | 3480 |
| Comparative Example 6 | 8.7 | 2.1 | 13.15 | 2.21 | 5.95 | 1.4 | 142 | 65 | 1980 |
| Example 8 | 3.4 | 2.9 | 3.24 | 2.31 | 1.40 | 0.89 | 209 | 73 | 2140 |
| Comparative Example 7 | 8.4 | 2.4 | 14.67 | 2.31 | 6.35 | 1.3 | 141 | 66 | 930 |
| Example 9 | 3.2 | 2.7 | 3.15 | 2.27 | 1.39 | 0.94 | 206 | 76 | 2100 |
| Comparative Example 8 | 8.3 | 2.3 | 13.28 | 2.22 | 5.98 | 1.6 | 157 | 62 | 990 |

In Table 1, the term "Firing Temperature for Carbonization" refers to a temperature for firing under an inert atmosphere, the term "pH" refers to the pH of the dispersion liquid before being subjected to spray drying, and the term "Mass Ratio of Active Material Particle/Carbon-Containing Compound" refers to the mass ratio in mixing the active particle materials and carbon-containing compound used for the raw material.

In Table 2, the term "d50 after coating" refers to the average particle size (median diameter) of the active material after coating the active material particles with the carbon material layer. The term "film thickness" refers to the film thickness of the carbon material layer, measured by TEM observation of random single primary particle selected from among multiple active material particles.

Examples 1 to 2 and 4 to 6 represent changes in the respective property values and cycle characteristics through the change in the amount of carbon coating. Comparative Examples 4 and 5 refers to results of using sugar as the carbon-containing compound. For example, when Examples 1 to 2 and 4-6 herein are compared with Comparative Examples 4 and 5, it is determined that Examples 1 to 2 and 4-6 have excellent cycle characteristics due to improved coating performance.

Example 3 represents the result of applying a carbon coating in the same way as in Example 1 with the use of a material with a specific surface area increased by a hydrothermal synthesis method. Example 3 herein shows favorable cycle characteristics as with Example 1.

Comparative Example 1 is an example of making the ratio S/W less than 0.5 by increasing the amount of carbon coating. The Li diffusion performance is blocked by an excessively large amount of carbon coating. As a result, it is determined that degradation has proceeded more than in Examples 1 to 6, due to the increased overvoltage on the negative electrode during the cycle.

Comparative Example 2 is an example of making the ratio S/W in excess of 5 by inversely reducing the amount of the carbon coating. The small amount of carbon coating has insufficiently inhibited the side reaction during the cycle, thereby resulting in cycle characteristics degraded more than in Examples 1 to 6.

Comparative Example 3 refers to a result of carrying out spray drying without adjusting the degree of saponification of polyvinyl alcohol and the pH value of the aqueous solution. Comparative Example 3 herein has cycle characteristics degraded as compared with Example 1, because of the low coating uniformity.

Example 7 and Comparative Example 6, Example 8 and Comparative Example 7, and Example 9 and Comparative Example 8 are respectively examples of using the active material particles consist of the single phase of spinel-type lithium-titanium oxide $Li_4Ti_5O_{12}$, the active material particles consist of the single phase of strontium-containing orthorhombic lithium-titanium compound $Li_2SrTi_6O_{14}$, and the active material particles consist of the single phase of orthorhombic sodium-containing lithium-titanium compound $Li_2Na_2Ti_6O_{14}$, and using polyvinyl alcohol and sucrose for each of the three types of active material particles. It is determined that Examples 7 to 9 have cycle characteristics improved even in the case of using, as active material particles, no $TiNb_2O_7$ for use in Example 1 and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising:
   active material particles each allowing lithium to be inserted thereinto and extracted therefrom in a range of 0.5 V to 2 V (vs. Li+/Li); and
   at least one carbon material layer at least partially coating the active material particles,
   wherein
   the active material particles comprise a titanium-containing metal composite oxide comprising a niobium-titanium composite oxide,
   a BET specific surface area S in a nitrogen adsorption method is 2 $m^2$/g to 20 $m^2$/g, and a ratio of S/M ($m^2$/g) is 0.5 ≤S/M≤5 between the BET specific surface area S and a proportion M (mass %) of a mass of the at least one carbon material layer carbon material layers to a total mass of the active material particles and the at least one carbon material layer carbon material layers,
   the at least one carbon material layer comprises 2 mass % or more of amorphous carbo,
   the at least one carbon material layer shows, in a Raman chart obtained by Raman spectrometry using a 532-nm measuring light source, a G band observed at from 1530 $cm^{-1}$ to 1630 $cm^{-1}$ and a D band observed at from 1280 $cm^{-1}$ to 1380 $cm^{-1}$, and a ratio $I_G/I_D$ between a peak intensity $I_G$ of the G band and a peak intensity $I_D$ of the D band is from 0.8 to 1.2.

2. The active material according to claim 1, wherein the BET specific surface area S is 2 $m^2$/g to 10 $m^2$/g.

3. The active material according to claim 1, wherein the at least one carbon material layer falls within a range of 0.5 nm to 15 nm in film thickness.

4. A nonaqueous electrolyte battery, comprising:
   a positive electrode,
   a negative electrode comprising the active material according to claim 1, and
   a nonaqueous electrolyte.

5. A battery pack comprising the nonaqueous electrolyte battery according to claim 4.

6. The battery pack according to claim 5, further comprising:
   an external power distribution terminal; and
   a protective circuit.

7. A battery pack comprising nonaqueous electrolyte batteries, each of the nonaqueous electrolyte batteries comprising:
   a negative electrode comprising the active material according to claim 1;
   a positive electrode; and
   a nonaqueous electrolyte;
   wherein the nonaqueous electrolyte batteries are connected in series, in parallel, or with a combination of a series connection and a parallel connection.

8. A vehicle comprising the battery pack according to claim 5.

9. The vehicle according to claim 8, wherein the battery pack is configured to recover a regenerative energy caused by a power of the vehicle.

10. The active material according to claim 1, wherein
    the active material particles comprise primary particles, and
    the at least one carbon material layer at least partially coats the primary particles.

11. The active material according to claim 1, wherein
    the active material particles comprise secondary particles, and
    the at least one carbon material layer at least partially coats the secondary particles.

12. The active material according to claim 10, wherein the primary particles comprise a primary particle whose entire surface is coated with the at least one carbon material layer.

13. The active material according to claim 1, wherein the ratio $I_G/I_D$ is from 0.8 to 1.12.

14. The active material according to claim 1,
    wherein
    a full width at half maximum for the G band is from 71 $cm^{-1}$ to 82 $cm^{-1}$, and
    a full width at half maximum for the D band is from 186 $cm^{-1}$ to 212 $cm^{-1}$.

15. An electrode comprising the active material according to claim 1.

* * * * *